US012763629B2

(12) United States Patent
Lee

(10) Patent No.: US 12,763,629 B2
(45) Date of Patent: Oct. 13, 2026

(54) MOTOR AND METHOD OF MANUFACTURING SAME

(71) Applicant: HL MANDO CORPORATION, Gyeonggi-do (KR)

(72) Inventor: Chungseong Lee, Gyeonggi-do (KR)

(73) Assignee: HL MANDO CORPORATION, Gyeonggi-do (KR)

(*) Notice: Subject to any disclaimer, the term of this patent is extended or adjusted under 35 U.S.C. 154(b) by 223 days.

(21) Appl. No.: 18/412,474

(22) Filed: Jan. 13, 2024

(65) Prior Publication Data

US 2024/0313608 A1 Sep. 19, 2024

(30) Foreign Application Priority Data

Mar. 17, 2023 (KR) ........................ 10-2023-0034919

(51) Int. Cl.
*H02K 5/18* (2006.01)
*H02K 15/12* (2025.01)
*H02K 15/14* (2025.01)

(52) U.S. Cl.
CPC ............... *H02K 5/18* (2013.01); *H02K 15/12* (2013.01); *H02K 15/14* (2013.01)

(58) Field of Classification Search
CPC ........... H02K 5/18; H02K 15/12; H02K 15/14
USPC ...................................... 310/43, 45, 64, 412
See application file for complete search history.

(56) References Cited

U.S. PATENT DOCUMENTS

| | | | | |
|---|---|---|---|---|
| 5,939,102 A * | 8/1999 | George, Jr. | ............. | B29C 70/70 425/127 |
| 2004/0061386 A1* | 4/2004 | Amagi | ..................... | H02K 5/08 310/43 |
| 2005/0074548 A1* | 4/2005 | Puterbaugh | ............ | H02K 15/12 427/104 |

FOREIGN PATENT DOCUMENTS

| | | | | |
|---|---|---|---|---|
| EP | 4068597 A2 * | 10/2022 | ............. | H02K 15/12 |
| JP | 2013-99244 | 5/2013 | | |
| JP | 2018-82553 | 5/2018 | | |
| KR | 10-0135988 | 6/1998 | | |
| KR | 20-0357621 | 7/2004 | | |
| KR | 10-2014-0142422 | 12/2014 | | |

OTHER PUBLICATIONS

Office Action dated Jan. 24, 2025 for Korean Patent Application No. 10-2023-0034919 and its English translation from Global Dossier.

* cited by examiner

*Primary Examiner* — Jose A Gonzalez Quinones
(74) *Attorney, Agent, or Firm* — WOMBLE BOND DICKINSON (US) LLP

(57) ABSTRACT

A method of manufacturing a motor may include providing a motor stator including a stator core in which a center hole extending in one direction is formed, a coil disposed on a circumference of the center hole and wound around the stator core, and a first impregnated portion which is formed to protrude from one side of the stator core and in which a first connecting hole connected to the center hole is formed, providing a motor rotor including a rotary shaft and a rotor core coupled to the rotary shaft, providing a housing body having one open side and an accommodation space therein, arranging the motor stator in the accommodation space, arranging the motor rotor in the center hole of the motor stator, and providing a housing cover for closing the accommodation space.

4 Claims, 23 Drawing Sheets

MOTOR AND METHOD OF MANUFACTURING SAME

CROSS-REFERENCE TO RELATED APPLICATION

This application claims priority to and the benefit of Korean Patent Application No. 10-2023-0034919, filed on Mar. 17, 2023, the disclosure of which is incorporated herein by reference in its entirety.

BACKGROUND

1. Technical Field

The present disclosure generally relates to a motor and a method of manufacturing the same, and more specifically, a motor capable of efficiently dissipating heat and a method of manufacturing the same.

2. Related Art

Motors are apparatuses for converting electrical energy into mechanical kinetic energy. The performance of such a motor is limited by the ability of emitting heat generated by a core and a coil of the motor to the outside (that is, heat-dissipating performance). For example, the operating performance of the motor, such as maximum and continuous output power of the motor, is dependent on the above-described heat-dissipating performance.

In order to secure the heat-dissipating performance of the motors, water-cooled motors, oil-cooled motors, and air-cooled motors have been developed. In conventional water-cooled motors or oil-cooled motors, a predetermined working fluid circulates inside and outside the motor. In this case, the working fluid in the motor absorbs heat of the motor, and the working fluid outside of the motor emits the absorbed heat to the outside, thereby securing the heat-dissipating performance of the motor.

However, since such the conventional water-cooled motors or oil-cooled motors necessarily require separate components such as a pump for circulating the working fluid and a pipe through which the working fluid flows, there are problems that manufacturing and maintenance costs are high and the motor is heavy.

Meanwhile, since the air-cooled motors do not require separate components for circulating the working fluid, the air-cooled motors have an advantage of low manufacturing and maintenance costs and light weight compared to the above-described water-cooled motor or oil-cooled motor.

In such air-cooled motors, heat generated by a core and a coil is primarily transferred to a motor housing, and the heat transferred to the motor housing is secondarily transferred to outside air, thereby securing the heat-dissipating performance of the motor.

In a motor stator and a motor manufactured by the conventional method, a gap filled with air may be generated between outer surfaces of a core and a coil and an inner wall of a motor housing. However, in general, since gaseous air has a lower heat transfer rate than other solid materials, the motor stator and the motor manufactured according to the conventional method have a problem of low heat-dissipating performance due to low heat transferability of the air gap.

In order to solve the problem, a process of forming a heat transfer portion by impregnating a coil with an impregnating agent has been proposed. However, due to complex shapes of a core and a coil and the fluidity of an impregnating agent, it is very difficult to form a heat transfer portion having an appropriate shape and characteristics between the core, the coil, and a motor housing.

Accordingly, there has been a need for development of a method of manufacturing a motor stator and a motor through which a heat transfer portion having an appropriate shape is formed regardless of shapes of a core and a coil and the fluidity of an impregnating agent.

SUMMARY

The present disclosure is directed to providing a motor with improved heat-dissipating performance and a method of manufacturing the same.

The present disclosure is also directed to providing a motor which is light and of which manufacturing and maintenance costs are low and a method of manufacturing the same.

Objectives of the present disclosure are not limited to the above-described objectives, and other objectives which are not described above will be clearly understood to those skilled in the art from the following description.

According to an aspect of the present disclosure, there is provided a method of manufacturing a motor, the method including providing a motor stator including a stator core in which a center hole extending in one direction is formed, a coil disposed on a circumference of the center hole and wound around the stator core, and a first impregnated portion which is formed to protrude from one side of the stator core and in which a first connecting hole connected to the center hole is formed, providing a motor rotor including a rotary shaft and a rotor core coupled to the rotary shaft, providing a housing body having one open side and an accommodation space therein, arranging the motor stator in the accommodation space, arranging the motor rotor in the center hole of the motor stator, and providing a housing cover for closing the accommodation space.

The providing of the motor stator may include providing a stacked-wound core assembly including the stator core in which the center hole extending in the one direction is formed and the coil disposed on the circumference of the center hole and wound around the stator core and forming a first impregnated portion on one side of the stacked-wound core assembly so that heat generated by the stator core and the coil is transferred to an outside, wherein the forming of the first impregnated portion may include providing an outer impregnation jig including an outer impregnation body in which an impregnation space is provided, arranging a first end-turn portion of the coil protruding outward from the stator core in the impregnation space, injecting a first impregnating agent into the impregnation space so that the first end-turn portion is impregnated, curing the first impregnating agent injected into the impregnation space to form the first impregnated portion including the first connecting hole connected to the center hole, and separating the outer impregnation jig from the first impregnated portion.

An opening, which allows the impregnation space to communicate with the outside, may be formed in the outer impregnation body. In the arranging of the first end-turn portion in the impregnation space, the outer impregnation body may be disposed so that the opening faces upward, and an end portion of the first end-turn portion may be disposed to face upward. In the injecting of the first impregnating agent into the impregnation space, the first impregnating agent may be injected through the opening so that the impregnation space is filled with the first impregnating agent from a lower portion to an upper portion of the impregnation space.

The outer impregnation body may include an indication part for indicating a target injection amount of the first impregnating agent, and in the injecting of the first impregnating agent injection, the first impregnating agent may be injected into the impregnation space as much as the target injection amount indicated by the indication part.

The indication part may include a reference surface provided along a circumference of the opening, and in the injecting of the first impregnating agent, the first impregnating agent may be injected so that a level of the first impregnating agent injected into the impregnation space reaches the reference surface.

The forming of the first impregnated portion may include providing an inner impregnation jig including an inner impregnation body extending in the one direction, arranging the inner impregnation jig in the center hole of the stator core, and separating the inner impregnation jig from the first impregnated portion, and in the injecting of the first impregnating agent, the first impregnating agent may permeate between an outer surface of the first end-turn portion and an outer side surface of the inner impregnation body.

The forming of the first impregnated portion may include providing a supporting jig including a supporting body in a tubular shape having a supporting space therein, arranging the stator core in the supporting space so that the stacked-wound core assembly is supported by the supporting jig, and withdrawing the stacked-wound core assembly in which the first impregnated portion is formed from the supporting space.

A supporting opening, which allows the supporting space to communicate with the outside, may be formed in the supporting body, a corresponding opening, which allows the impregnation space to communicate with the outside, may be formed in the outer impregnation body. In the arranging of the stator core in the supporting space, the stator core may be disposed so that the first end-turn portion protrudes outward from the opening of the supporting body. In the arranging of the first end-turn portion in the impregnation space, a circumferential portion of the support opening may be disposed in contact with a circumferential portion of the corresponding opening so that the impregnation space is connected to the supporting space.

The forming of the first impregnated portion may include providing an inner impregnation jig including an inner impregnation body extending in the one direction, arranging the inner impregnation jig in the center hole of the stator core, and separating the inner impregnation jig from the first impregnated portion, wherein, in the arranging of the inner impregnation jig in the center hole, one end portion of the inner impregnation body may be disposed in contact with a bottom surface of the supporting body so that the inner impregnation jig is supported by the supporting jig, and in the injecting of the first impregnating agent, the first impregnating agent may be injected between an inner side surface of the outer impregnation body and an outer side surface of the outer impregnation body.

The providing of the motor stator may further include forming a second impregnated portion on the other side of the stacked-wound core assembly so that the heat generated by the stator core and the coil is transferred to the outside, wherein the forming of the second impregnated portion may include arranging a second end-turn portion of the coil protruding outward from the stator core in the impregnation space, injecting a second impregnating agent into the impregnation space so that the second end-turn portion is impregnated, curing the second impregnating agent injected into the impregnation space to form a second impregnated portion including a second connecting hole connected to the center hole, and separating the outer impregnation jig from the second impregnated portion.

The arranging of the motor stator in the accommodation space may include injecting a second impregnating agent into the accommodation space, arranging an end portion of the first impregnated portion to face a bottom surface of the housing body, inserting the motor stator into the accommodation space, and curing the second impregnating agent to form a heat sink portion between an outer surface of the first impregnated portion and an inner surface of the housing body.

The method may further include coating the outer surface of the first impregnated portion with a heat sink liquid to increase a heat transfer rate between the motor stator and the housing body before the arranging of the motor stator in the accommodation space, A pedestal extending inward of the accommodation space may be formed on the bottom surface of the housing body, in the arranging of the motor stator in the accommodation space, the pedestal may be inserted into the first connecting hole of the first impregnated portion as the motor stator is inserted into the accommodation space, and in the injecting of the second impregnating agent, a part of the second impregnating agent may permeate between an inner circumferential surface of the first connecting hole and an outer circumferential surface of the pedestal.

In the arranging of the motor stator in the accommodation space, an end portion of the first impregnated portion may be disposed to face the one side of the accommodation space, and the providing of the housing cover may include injecting a second impregnating agent on one surface of the housing cover, arranging the one surface of the housing cover to face the end portion of the first impregnated portion, arranging the housing cover to be close to the housing body to close the accommodation space, and curing the second impregnating agent to form a heat sink portion between an outer surface of the first impregnated portion and the one surface of the housing cover.

A pedestal extending outward may be provided on the one surface of the housing cover, in the arranging of the housing cover to be close to the housing body, the pedestal may be inserted into the first connecting hole of the first impregnated portion as the housing body is close to the housing cover, and the providing of the housing cover may include making a part of the second impregnating agent permeate between an inner side surface of the first connecting hole and an outer side surface of the pedestal.

According to another aspect of the present disclosure, there is provided a motor including a motor housing including a predetermined accommodation space therein, a stator core disposed in the accommodation space and including a center hole extending in one direction, a coil which includes an extension portion passing through the stator core and an end-turn portion connected to the extension portion and protruding from a side portion of the stator core in the one direction and is wound around the stator core, a heat transfer portion which is interspersed between an inner wall of the motor housing and the end-turn portion to surround the end-turn portion and transfers heat generated by the coil to the motor housing, a rotor core rotatably disposed in the center hole, and a rotary shaft coupled to the rotor core.

A surface, which faces the inner wall of the motor housing, among outer side surfaces of the heat transfer portion may be in surface contact with the inner wall of the motor housing.

One part of the heat transfer portion may be formed by curing an impregnating agent injected into a predetermined jig after the stator core and the coil wound around the stator core are disposed in the jig, and another part of the heat transfer portion may be formed by curing an impregnating agent injected into the motor housing after the stator core, the coil wound around the stator core, and the one part of the heat transfer portion are disposed in the motor housing.

One part of the heat transfer portion may be formed by curing a first impregnating agent injected into a predetermined jig after the stator core and the coil wound around the stator core are disposed in the jig, and another part of the heat transfer portion may be formed by curing a second impregnating agent injected into the motor housing after the stator core and the coil wound around the stator core are disposed in the motor housing.

The motor housing may include a housing body in a tubular shape including the accommodation space extending in the one direction therein, a housing cover coupled to one side portion of the housing body to cover the accommodation space, and a heat sink fin protruding from an outer surface of the housing body to emit heat transferred to the housing body to an outside.

The end-turn portion may include a first end-turn portion and a second end-turn portion provided on both side portions of the stator core in the one direction, and the heat transfer portion may include a first heat transfer portion surrounding the first end-turn portion and a second heat transfer portion surrounding the second end-turn portion.

BRIEF DESCRIPTION OF THE DRAWINGS

Not only detailed descriptions of exemplary embodiments of the present invention described below but also the summary described above will be understood more easily when read with reference to the accompanying drawings. The exemplary embodiments are illustrated in the drawings to illustrate the present invention. However, it should be understood that the present invention is not limited to the exact layout and method illustrated in the drawings, in which.

DETAILED DESCRIPTION OF EXEMPLARY EMBODIMENTS

Figure 1A:
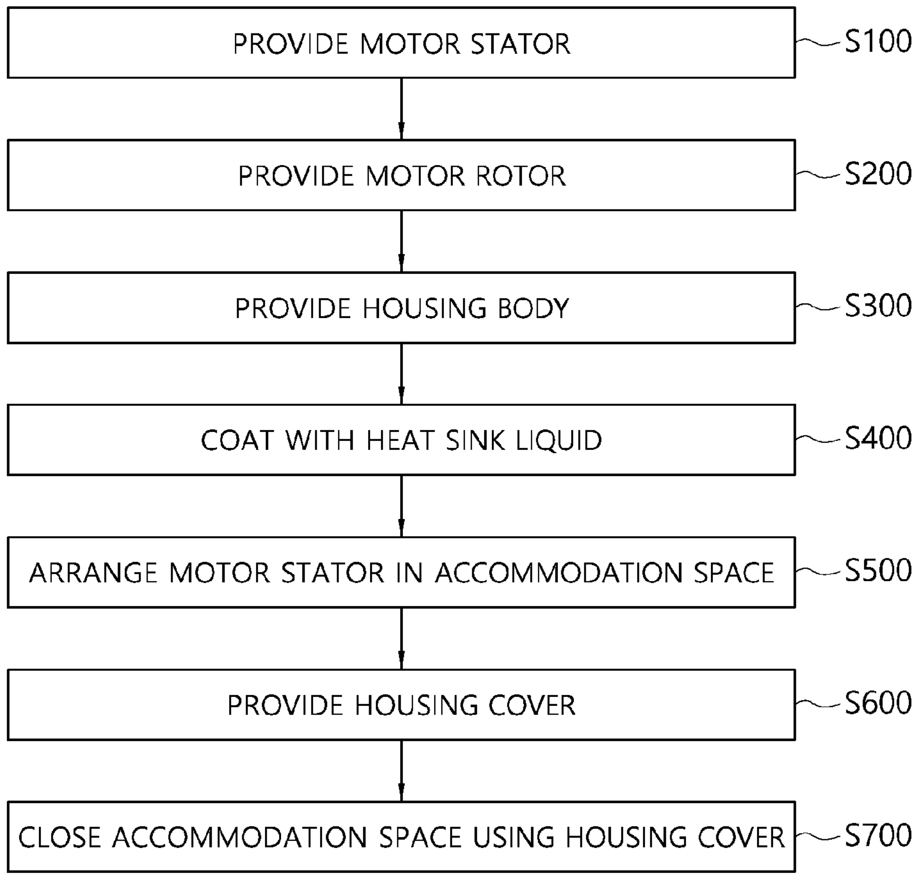
FIG. 1A is a flowchart illustrating a method of manufacturing a motor according to an embodiment of the present disclosure.

Hereinafter, embodiments of the present invention will be described in detail with reference to the accompanying drawings in order for those skilled in the art to easily perform the present invention. The present invention may be implemented in several different forms and is not limited to the embodiments described herein. Parts irrelevant to description are omitted in the drawings in order to clearly explain the present invention, and the same or similar parts are denoted by the same reference numerals throughout this specification.

Terms and words used in the present specification and claims should not be interpreted as being limited to commonly used meanings or meanings in dictionaries and should be interpreted as having meanings and concepts which are consistent with the technological scope of the invention based on the principle that the inventors have defined concepts of terms in order to describe the invention in the best way.

It should be understood that the terms "comprise," "include," and the like, when used herein, specify the presence of stated features, numbers, operations, elements, components, or groups thereof but do not preclude the presence or addition of one or more other features, numbers, operations, elements, components, or groups thereof.

Unless there are special circumstances, a case in which a first component is disposed "in front of," "behind," "above," or "under" a second component includes not only a case in which the first component is disposed directly "in front of," "behind," "above," or "under" the second component, but also a case in which a third component is interposed therebetween. Unless there are special circumstances, a case in which some components are connected to each other includes not only a case in which the components are directly connected to each other, but also a case in which the components are indirectly connected to each other.

In the present specification, an air gap is an air layer or air bubbles which may be generated between an inner wall of a motor housing and a core or coil of a stator. In general, since air which is gas has a lower thermal conductivity than other solid materials, when the air gap is generated, heat generated by the core and the coil may not be smoothly transferred to the motor housing.

A motor stator and a method of manufacturing a motor including the same according to one embodiment of the present invention relate a motor stator with improved heat-dissipating performance and a method of manufacturing a motor by forming an impregnated portion or a heat sink portion, a heat transfer rate of which is high while minimizing an air gap, at one side of a stator core so that heat may be effectively transferred to the motor housing.

Figure 1B:
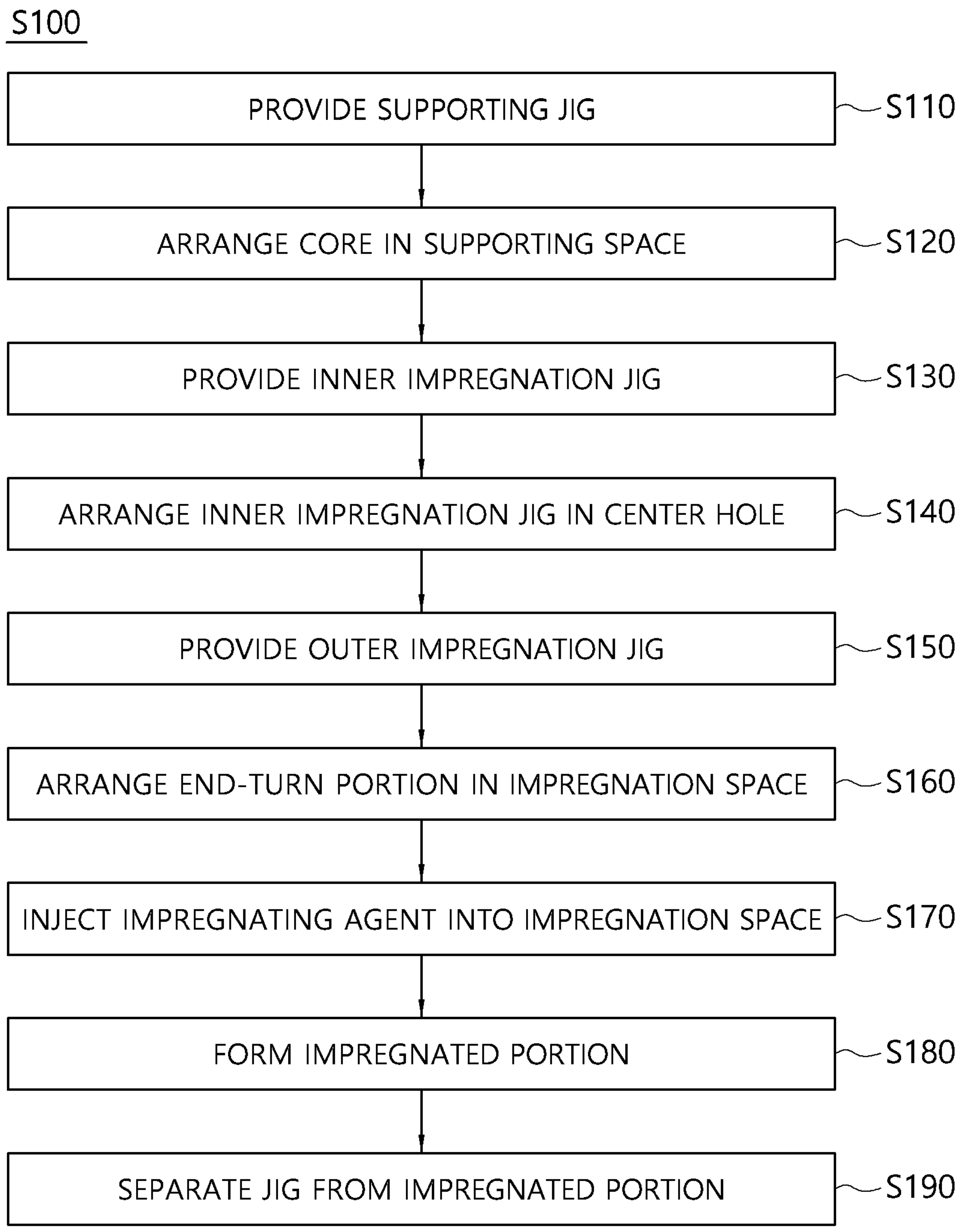
FIG. 1B is a flowchart illustrating a method of manufacturing a motor stator according to an embodiment of the present disclosure.
Figure 1C:
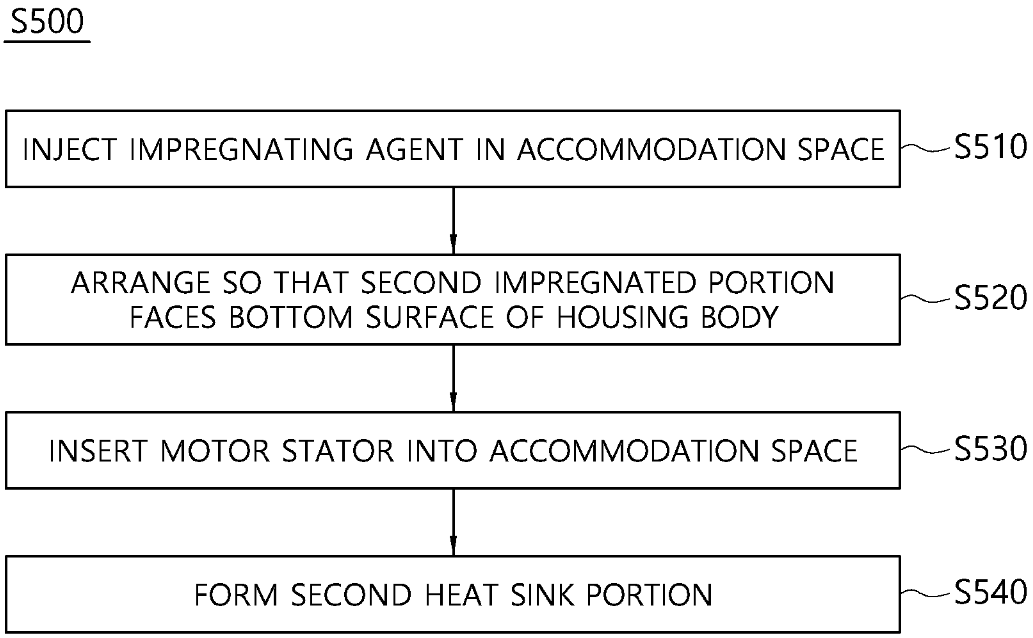
FIG. 1C is a detailed flowchart illustrating an operation of arranging a motor stator in an accommodation space of a housing body in the embodiment of FIG. 1A according to an embodiment of the present disclosure.
Figure 1D:
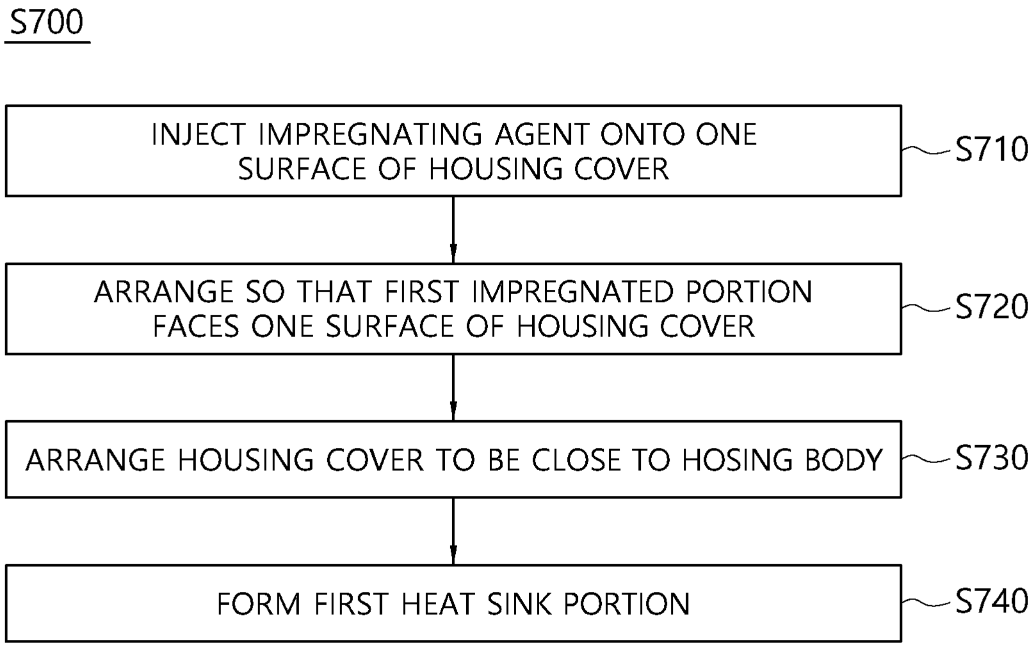
FIG. 1D is a detailed flowchart illustrating an operation of closing an accommodation space of a housing body using a housing cover in the embodiment of FIG. 1A according to an embodiment of the present disclosure.
Figure 2A:
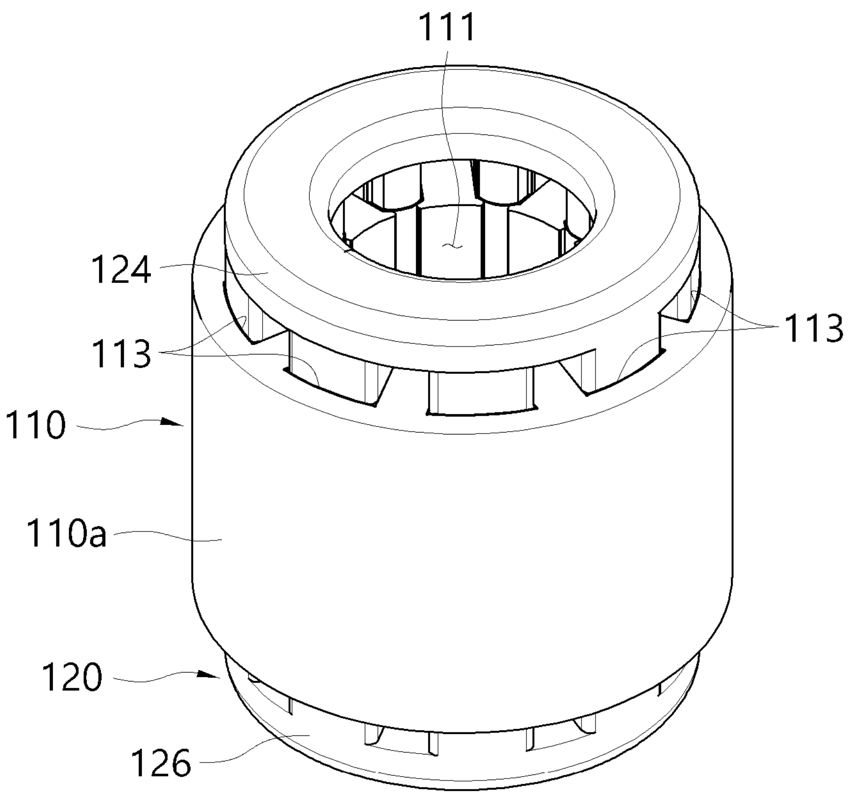
FIG. 2A is a top perspective view illustrating a stacked-wound core assembly according to an embodiment of the present disclosure.
Figure 2B:
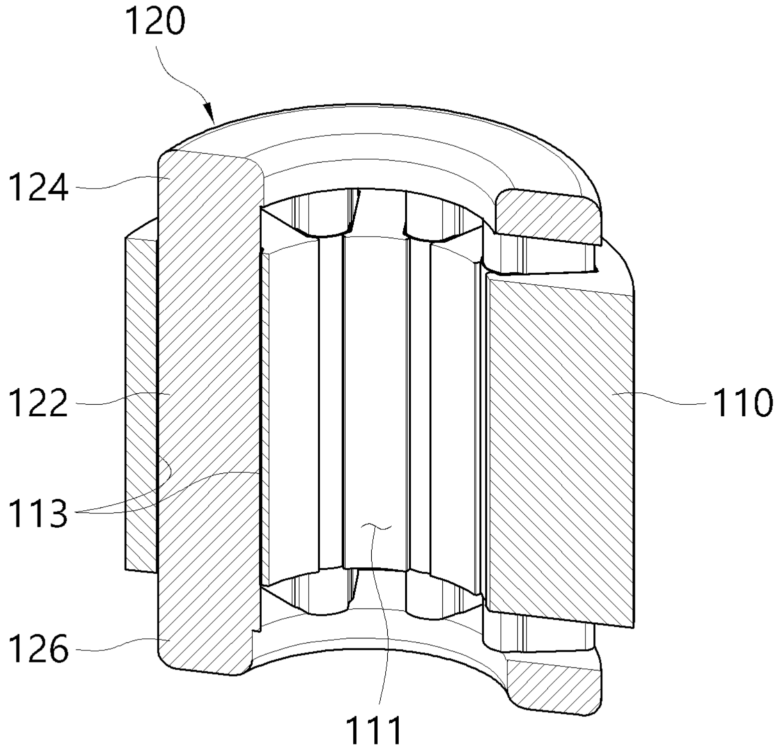
FIG. 2B is a vertical cross-sectional view illustrating a stacked-wound core assembly according to an embodiment of the present disclosure.

FIG. 1A is a flowchart illustrating a method of manufacturing a motor according to one embodiment of the present disclosure. FIG. 1B is a flowchart illustrating a method of manufacturing a motor stator according to one embodiment of the present disclosure. FIG. 1C is a detailed flowchart illustrating an operation of arranging a motor stator is disposed in an accommodation space according to the method of manufacturing a motor illustrated in FIG. 1A. FIG. 1D is a detailed flowchart illustrating an operation of closing the accommodation space using a housing cover according to the method of manufacturing a motor illustrated in FIG. 1A. FIG. 2A is a top perspective view illustrating a stacked-wound core assembly provided through the method of manufacturing a motor stator according to one embodiment of the present disclosure. FIG. 2B is a vertical cross-sectional view illustrating the stacked-wound core assembly illustrated in FIG. 2A.

Referring to FIGS. 1A and 2A, in the method of manufacturing a motor according to one embodiment of the present disclosure, a motor stator 100 (illustrated in FIG. 10) is provided (S100). In this case, operation S100 of providing the motor stator 100 (illustrated in FIG. 10) according to the present embodiment may be performed by the method of manufacturing a motor stator according to one embodiment of the present disclosure.

Hereinafter, before describing the method of manufacturing a motor according to one embodiment of the present disclosure, the method of manufacturing a motor stator according to one embodiment of the present disclosure will be described.

Referring to FIGS. 1B, 2A, and 2B, in the method of manufacturing a motor stator according to one embodiment of the present disclosure, first, stacked-wound core assemblies 110 and 120 are provided. In this case, the stacked-wound core assemblies 110 and 120 provided through the present embodiment may include a stator core 110 and a coil 120.

Referring to FIGS. 2A and 2B, in the present embodiment, the stator core 110 may be provided as a cylindrical metal part extending in a vertical direction. In addition, a center hole 111 may be formed to vertically extend in the stator core 110. In this case, an upper portion and a lower portion of the center hole 111 may open outward. In the present embodiment, a motor rotor 300 (illustrated in FIG. 16A), which will be described below, is disposed in the center hole 111.

According to the present embodiment, a plurality of slots 113 may be formed around a circumference of the center hole 111 of the stator core 110. The slots 113 are for providing spaces through which the coil 120, which will be described below, passes. The plurality of slots 113 may be disposed to be spaced apart from each other in a circumferential direction of the center hole 111.

In this case, in the present embodiment, the plurality of slots 113 may vertically extend so that upper portions and lower portions may open outward. In addition, side portions the slots 113 facing the center hole 111 may be connected to the center hole 111.

Meanwhile, in the present embodiment, the stator core 110 is illustrated to have the cylindrical shape, but an exterior of the stator core 110 may be modified according to characteristics of a motor to be manufactured. For example, a horizontal cross section of the stator core 110 may be provided as a polygonal shape. In addition, in the present embodiment, the stator core 110 is provided as an assembly of vertically stacked thin metal plates but is not limited thereto, and the stator core 110 may be provided as one part.

Referring to FIGS. 2A and 2B again, the coil 120 may be wound around the stator core 110. In this case, in the present embodiment, the coil 120 is illustrated to be provided as one part, but the coil 120 may be provided as an assembly of thin metal wires wound around the stator core 110 several times.

For example, in the case of a three-phase motor, the coil 120 may be formed of three metal wires which are wound around the stator core 110 several times by passing through the slots 113 of the stator core 110 and wound around the stator core 110 several times by passing through the other adjacent slots 113 at the same time.

In the present embodiment, the coil 120 may include an extension portion 122 passing through the slots 113 and a first end-turn portion 124 and a second end-turn portion 126 provided at an upper side and a lower side of the extension portion 122, respectively.

In this case, the first end-turn portion 124 may be formed as an assembly of one portions of the curved metal wires passing through upper openings of the slots 113 and upper openings of the adjacent slots 113. The first end-turn portion 124 may be formed to protrude upward from the stator core 110 and may be provided along the circumference of the center hole 111.

In addition, according to the present embodiment, the second end-turn portion 126 may be formed at a lower side of the stator core 110 to be symmetrical with respect to the stator core 110. However, as necessary, the second end-turn portion 126 may be provided to have a different shape from a shape of the first end-turn portion 124.

Meanwhile, since the first end-turn portion 124 and the second end-turn portion 126 are formed of the curved metal wires, the first end-turn portion 124 and the second end-turn portion 126 may be the largest heat sources of the motor. Accordingly, a predetermined heat transfer portion may be formed outside the first end-turn portion 124 and the second end-turn portion 126 to improve the heat-dissipating performance.

The heat transfer portion may be formed by impregnating the first end-turn portion 124 and the second end-turn portion 126 with an impregnating agent. However, since the first end-turn portion 124 and the second end-turn portion 126 are formed by assembling the curved metal wires, the first end-turn portion 124 and the second end-turn portion 126 have complex shapes. In addition, the impregnating agent has predetermined fluidity. Accordingly, it is very difficult to form the heat transfer portion having an appropriate shape at the outer sides of the first end-turn portion 124 and the second end-turn portion 126 by impregnating the first end-turn portion 124 and the second end-turn portion 126 with the impregnating agent.

However, according to the method of manufacturing a motor stator according to one embodiment of the present disclosure, even when a shape of the coil is complex or the impregnating agent moves, since the impregnated portion which may effectively transfer and emit heat may be formed, the heat-dissipating performance of the motor stator and the motor including the same can be significantly improved.

Hereinafter, the formation of the impregnated portion for effectively transferring and dissipating heat generated by the stator core and the coil will be described in more detail according to the method of manufacturing a motor stator according to one embodiment of the present disclosure.

Figure 3:
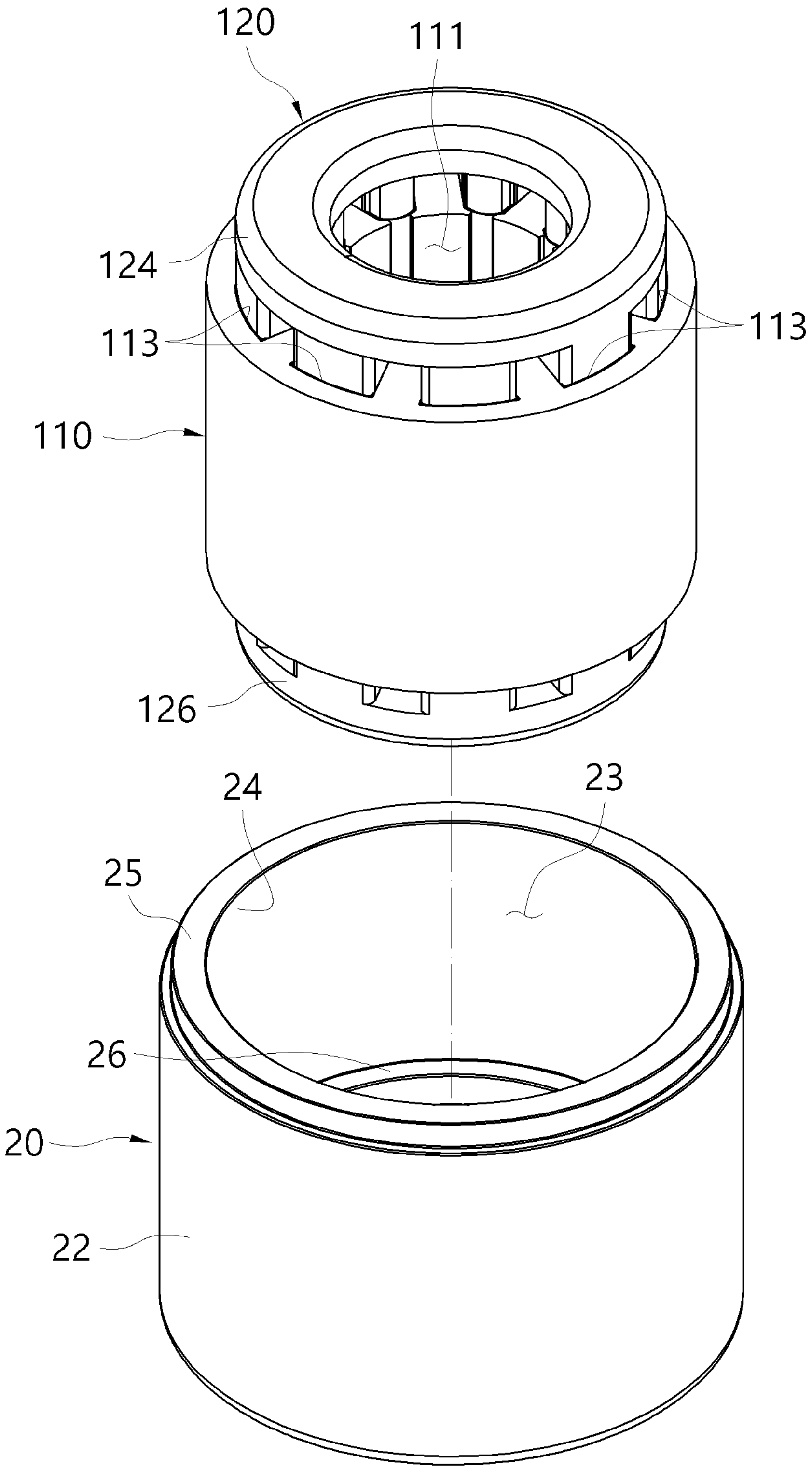
FIG. 3 is a view for describing a process of disposing a core in a supporting space of a supporting jig according to an embodiment of the present disclosure.
Figure 4:
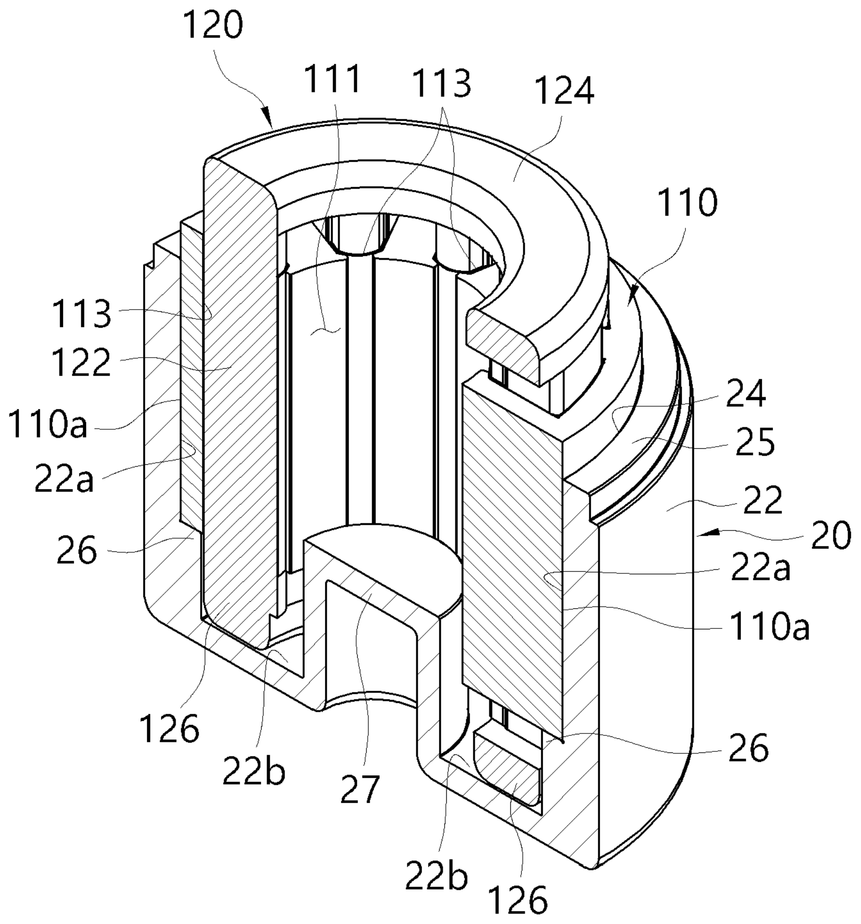
FIG. 4 is a vertical cross-sectional view illustrating a stacked-wound core assembly and a supporting jig disposed in a supporting space of a supporting jig according to an embodiment of the present disclosure.
Figure 5:
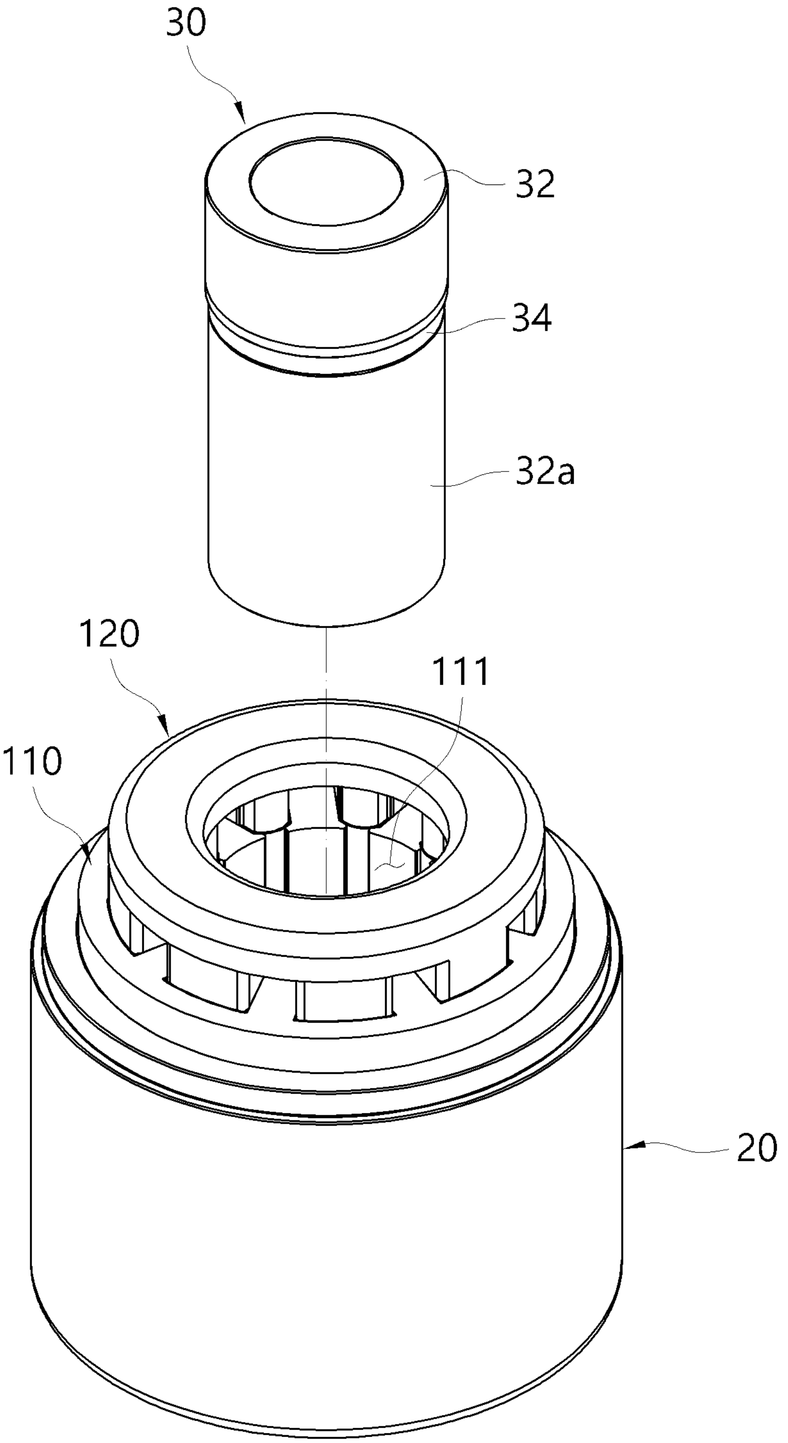
FIG. 5 is a view for describing a process of disposing an inner impregnation jig in a center hole of a stator core according to an embodiment of the present disclosure.
Figure 6:
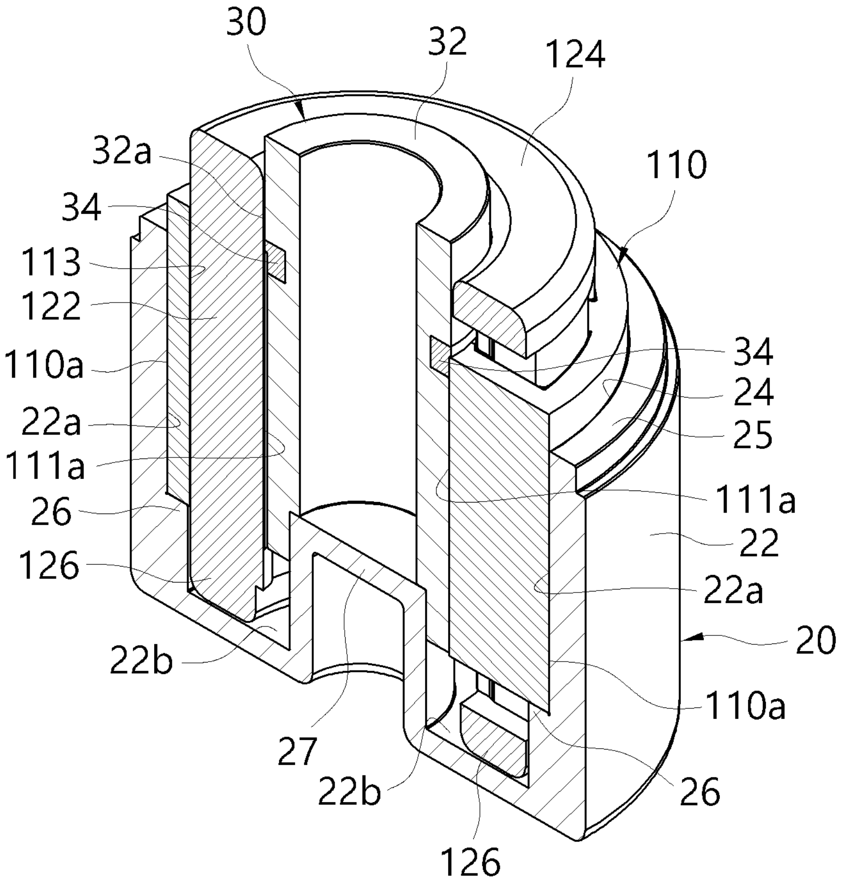
FIG. 6 is a vertical cross-sectional view illustrating an inner impregnation jig, a stacked-wound core assembly, and a supporting jig disposed in a supporting hole according to an embodiment of the present disclosure.
Figure 7:
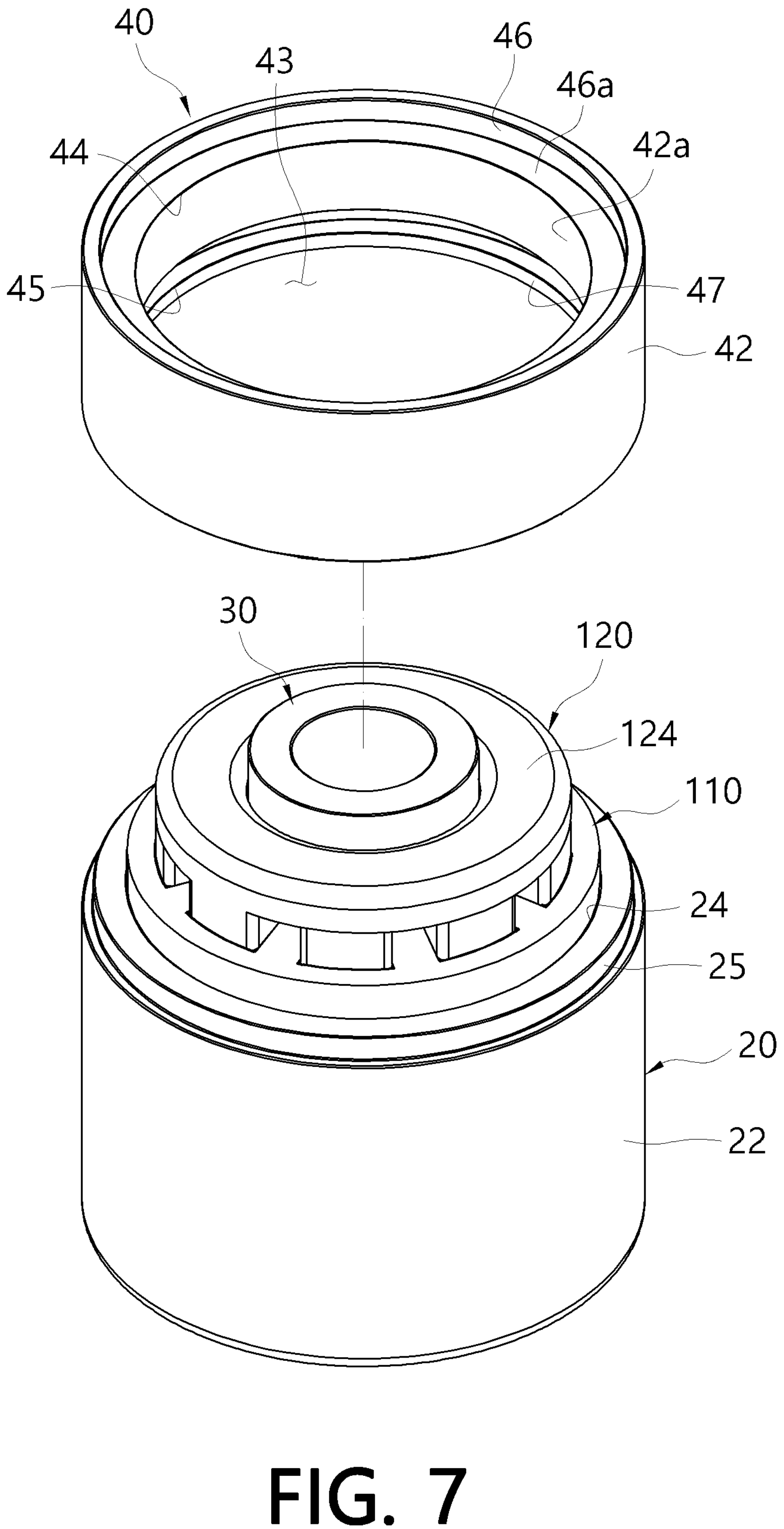
FIG. 7 is a view for describing a process of disposing a first end-turn portion of a coil in an impregnation space of an outer impregnation jig according to an embodiment of the present disclosure.
Figure 8:
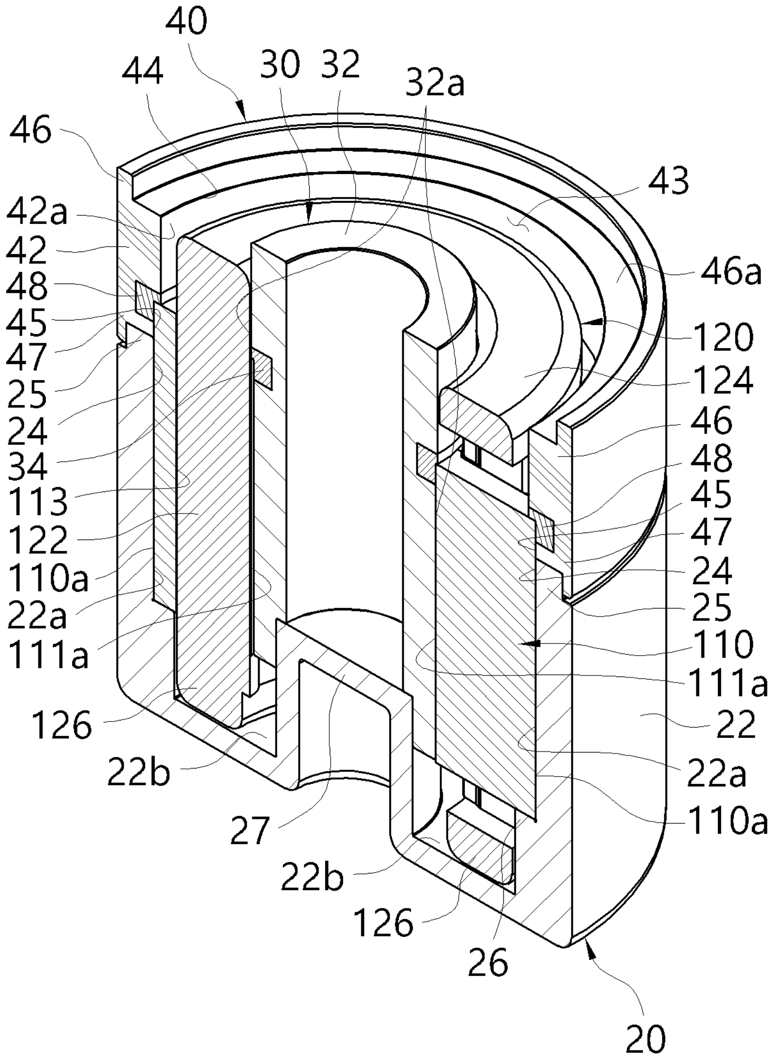
FIG. 8 is a vertical cross-sectional view illustrating an outer impregnation jig, an inner impregnation jig, a stacked-wound core assembly, and a supporting jig when a first end-turn portion of a coil is disposed in an impregnation space of an outer impregnation jig according to an embodiment of the present disclosure.
Figure 9A:
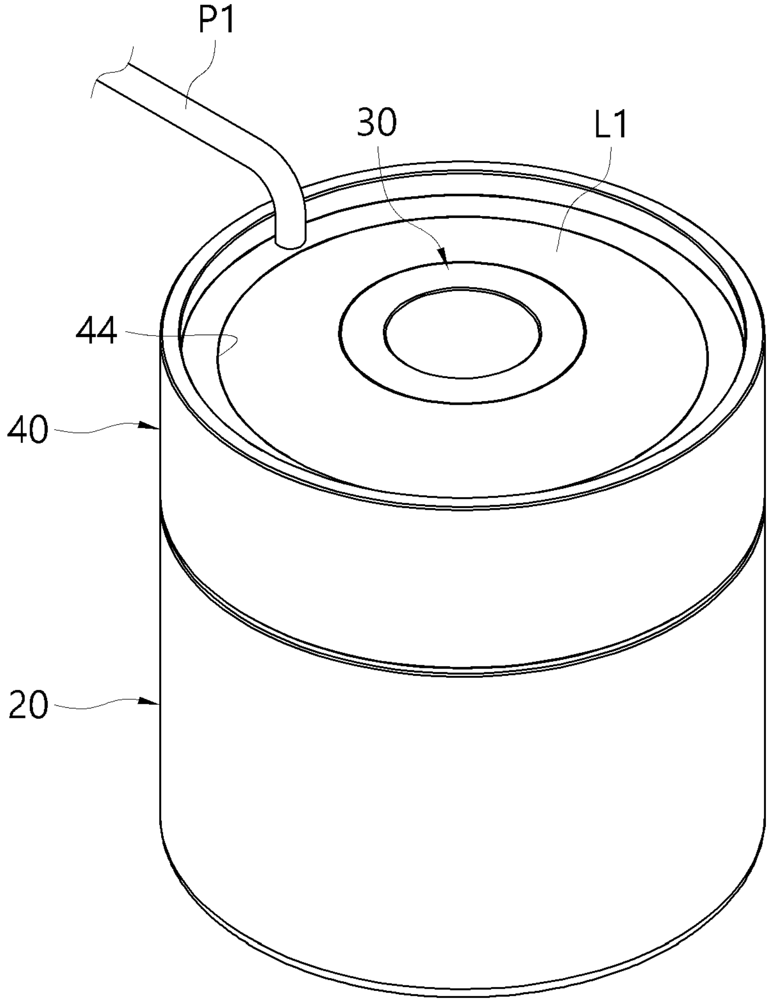
FIG. 9A is a view for describing a process of injecting an impregnating agent into an impregnation space of an outer impregnation jig according to an embodiment of the present disclosure.
Figure 9B:
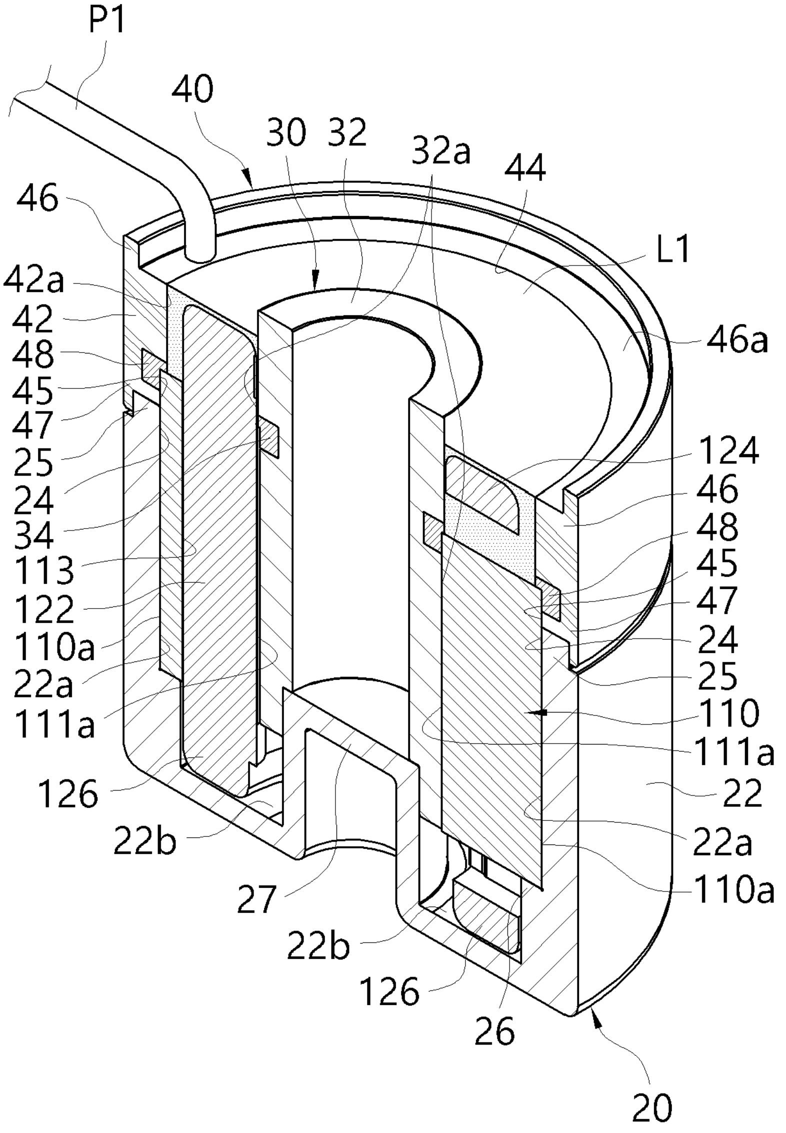
FIG. 9B is a vertical cross-sectional view illustrating an outer impregnation jig, an inner impregnation jig, a stacked-wound core assembly, and a supporting jig illustrated in FIG. 9A.
Figure 10:
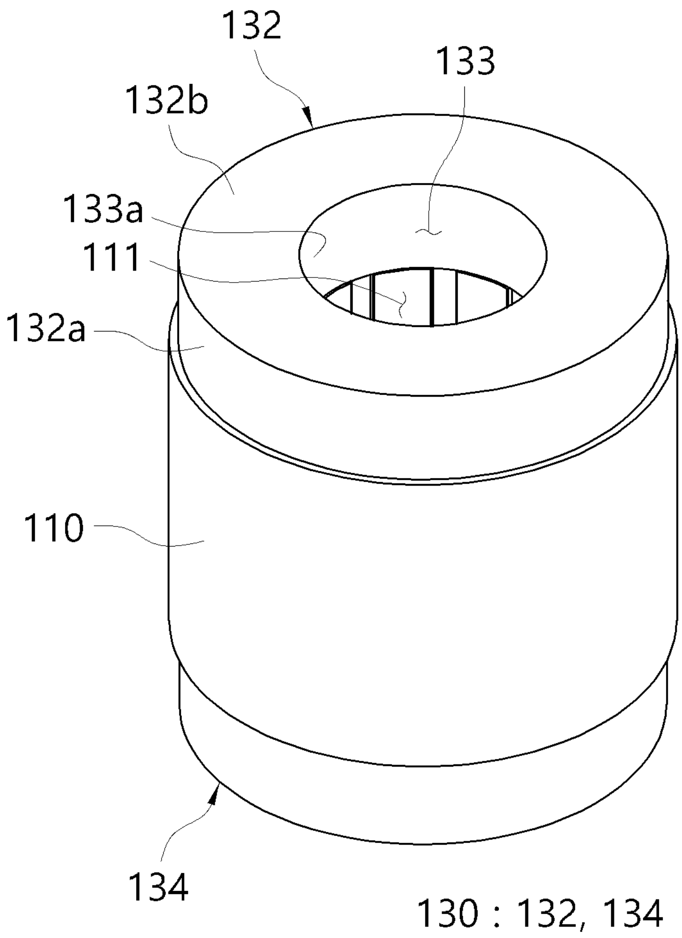
FIG. 10 is a top perspective view illustrating a motor stator according to an embodiment of the present disclosure.

FIG. 3 is a view for describing a process in which the core is disposed in a supporting space according to the method of manufacturing a motor stator according to one embodiment of the present disclosure. FIG. 4 is a vertical cross-sectional view illustrating the stacked-wound core assembly and a supporting jig disposed in the supporting space through the method of manufacturing a motor stator according to one embodiment of the present disclosure. FIG. 5 is a view for describing a process in which an inner impregnation jig is disposed in the center hole according to the method of manufacturing a motor stator according to one embodiment of the present disclosure. FIG. 6 is a vertical cross-sectional view illustrating the inner impregnation jig, the stacked-wound core assembly, and the supporting jig which are disposed in a supporting hole through the method of manufacturing a motor stator according to one embodiment of the present disclosure. FIG. 7 is a view for describing a process in which the first end-turn portion of the core is disposed in an impregnation space of an outer impregnation jig according to the method of manufacturing a motor stator according to one embodiment of the present disclosure. FIG. 8 is a vertical cross-sectional view illustrating the outer impregnation jig, the inner impregnation jig, the stacked-wound core assembly, and the supporting jig when the first end-turn portion of the coil is disposed in the impregnation space according to the method of manufacturing a motor stator according to one embodiment of the present disclosure. FIG. 9A is a view for describing a process of injecting the impregnating agent into the impregnation space through the method of manufacturing a motor stator according to one embodiment of the present disclosure. FIG. 9B is a vertical cross-sectional view illustrating the outer impregnation jig, the inner impregnation jig, the stacked-wound core assembly, and the supporting jig illustrated in FIG. 9A. FIG. 10 is a top perspective view illustrating the motor stator manufactured through the method of manufacturing a motor stator according to one embodiment of the present disclosure.

In the method of manufacturing a motor stator according to one embodiment of the present disclosure, the stacked-wound core assembly is provided, and a first impregnated portion is formed at one side of the stacked-wound core assembly.

In this case, referring to FIGS. 1B, 3, and 4, in the formation of the first impregnated portion according to the present embodiment, a supporting jig 20 for supporting the stacked-wound core assemblies 110 and 120 is provided (S110). In the present embodiment, the supporting jig 20 is for supporting the stacked-wound core assemblies 110 and 120 and other jigs, which will be described below, while the first impregnated portion is formed.

Referring to FIGS. 3 and 4, the supporting jig 20 provided through the present embodiment may include a supporting body 22, a circumferential portion 25, and a supporting protrusion 27.

In the present embodiment, the supporting body 22 may be provided as a member in a tubular shape which is open upward. More specifically, a supporting space 23 may be provided in the supporting body 22. The supporting space 23 may have substantially a cylindrical shape to facilitate support of lower portions of the stacked-wound core assemblies 110 and 120. In addition, the supporting space 23 may communicate with the outside through a supporting hole 24 provided in an upper portion of the supporting body 22.

In the present embodiment, the supporting hole 24 is a passage through which the stacked-wound core assemblies 110 and 120 pass to enter or exit the supporting space 23. The supporting hole circumferential portion 25 may be formed on a circumference of the supporting hole 24.

In this case, according to the present embodiment, the supporting hole circumferential portion 25 may have a stepped shape in an outward direction. Accordingly, the supporting hole circumferential portion 25 may be engaged with a lower portion of an outer impregnation jig 40 (illustrated in FIG. 7), which will be described below, and the supporting jig 20 may relatively fix a position of the outer impregnation jig 40 (illustrated in FIG. 7) and support the outer impregnation jig 40.

Meanwhile, referring to FIG. 4, in the present embodiment, a side portion and a lower portion of the supporting space 23 may be defined by an inner circumferential surface 22*a* and a bottom surface 22*b* of the supporting body 22, respectively. In this case, the inner circumferential surface 22*a* of the supporting body 22 may correspond to a shape of an outer circumferential surface 110*a* of the stator core 110. Accordingly, positions of the stacked-wound core assemblies 110 and 120 may be fixed parallel to the supporting jig 20 in the supporting space 23.

In this case, a core step portion 26 formed to be stepped so that a lower circumferential portion of the stator core 110 is seated on the core step portion 26 may be provided on the inner circumferential surface 22*a* of the supporting body 22. According to the present embodiment, an outer diameter of the outer circumferential surface 110*a* of the stator core 110 is greater than an outer diameter of the first end-turn portion 124 or the second end-turn portion 126. Accordingly, in the present embodiment, the core step portion 26 may be provided in a stepped shape so that an inner diameter of a lower portion of the inner circumferential surface 22*a* is smaller than an inner diameter of an upper portion of the inner circumferential surface 22*a*.

In addition, referring to FIG. 4, in the present embodiment, the supporting protrusion 27 may be formed in a center of the bottom surface 22*b* of the supporting body 22. The supporting protrusion 27 is for supporting a lower side of an inner impregnation jig 30 (illustrated in FIG. 5) which will be described below. In this case, the supporting protrusion 27 may protrude upward from the bottom surface 22*b*. In addition, an outer diameter of the supporting protrusion 27 in the horizontal direction may be smaller than an inner diameter of the center hole 111 so that an end portion of the supporting protrusion 27 enters the inside of the center hole 111 of the stator core 110.

Referring to FIGS. 1B, 3, and 4 again, in the formation of the first impregnated portion according to the present embodiment, the supporting jig 20 is provided (S110), and the stacked-wound core assemblies 110 and 120 are disposed in the supporting space 23 of the supporting jig 20 (S120).

In this case, in operation S120 in which the stacked-wound core assemblies 110 and 120 are disposed in the supporting space 23 according to the present embodiment, the stacked-wound core assemblies 110 and 120 may be inserted into the supporting space 23 while the second end-turn portion 126 is disposed to face the bottom surface 22*b* of the supporting body 22.

Accordingly, the lower circumferential portion of the stator core 110 may be in contact with and supported by the core step portion 26 of the supporting body 22, and a lower end portion of the second end-turn portion 126 may be disposed close to the bottom surface 22*b*. In this case, as described above, since the inner circumferential surface 22*a* of the supporting body 22 is formed to correspond to the outer circumferential surface 110*a* of the stator core 110, positions of the stacked-wound core assemblies 110 and 120 can be stably fixed in the supporting space 23.

Meanwhile, according to the present embodiment, in operation S120 in which the stacked-wound core assemblies 110 and 120 are disposed in the supporting space 23, the first end-turn portion 124 is disposed to protrude upward from the supporting hole 24. This is for the first end-turn portion 124 to be disposed in an impregnation space 43 (illustrated in FIG. 7) of the outer impregnation jig 40 (illustrated in FIG. 7) which will be described below.

Referring to FIGS. 1B, 5, and 6 again, in the formation of the first impregnated portion according to the present embodiment, the stacked-wound core assemblies 110 and 120 are disposed in the supporting space (S120), and the inner impregnation jig 30 is provided (S130). In the present embodiment, the inner impregnation jig 30 is a component for molding an exterior of the first impregnated portion.

In this case, the inner impregnation jig 30 provided through the present embodiment may include an inner impregnation body 32 and an inner sealing member 34. The inner impregnation body 32 may be provided as a member having a hollow tube shape which vertically extends.

In this case, in the present embodiment, an outer diameter of an outer circumferential surface 32*a* of the inner impregnation body 32 may be slightly smaller than or equal to the inner diameter of the center hole 111 of the stator core 110. Accordingly, the outer circumferential surface 32*a* of the inner impregnation body 32 may be in contact with an inner circumferential surface of the center hole 111. Accordingly, even when an impregnating agent is injected into the impregnation space (illustrated in FIG. 7), which will be described below, the impregnating agent may be prevented from leaking through between the outer circumferential surface 32*a* of the inner impregnation body 32 and the inner circumferential surface of the center hole 111.

In addition, in the present embodiment, in order to more effectively prevent the leakage of the impregnating agent described above, the inner sealing member 34 may be provided on the outer circumferential surface 32*a* of the inner impregnation body 32. The inner sealing member 34 may be formed along a circumference of the inner impregnation body 32. The inner sealing member 34 may be provided as an O-ring.

In this case, referring to FIG. 6, in the present embodiment, when the inner impregnation jig 30 is disposed in the center hole 111, a level of the inner sealing member 34 from the bottom surface 22*b* of the supporting body 22 spaced apart from the inner sealing member 34 in the vertical direction may be lower than or equal to a level of an upper end portion of the stator core 110 from the bottom surface 22*b* of the supporting body 22 in the vertical direction. This is for more effectively preventing the leakage of the impregnating agent.

In addition, referring to FIG. 6, in the present embodiment, when the inner impregnation jig 30 is disposed in the center hole 111, a level of an upper end portion of the inner impregnation body 32 from the bottom surface 22*b* of the supporting body 22 spaced apart from the upper end portion of the inner impregnation body 32 in the vertical direction may be higher than or equal to a level of a reference surface 46*a* (illustrated in FIG. 8) of the outer impregnation jig 40 (illustrated in FIG. 8) from the bottom surface 22*b* of the supporting body 22 spaced apart from reference surface 46*a* in the vertical direction. This is for preventing an injected impregnating agent injected to the reference surface 46*a* (illustrated in FIG. 8) from flowing out and is for forming an exterior of the impregnated portion.

Referring to FIGS. 1B and 6, in the formation of the first impregnated portion according to one embodiment of the present disclosure, the inner impregnation jig 30 is provided (S130), and the inner impregnation jig 30 is disposed in the center hole 111 of the stator core 110 (S140). In this case, in the present embodiment, the inner impregnation jig 30 may be disposed so that a lower portion of the inner impregnation body 32 is in contact with and supported by the supporting protrusion 27 of the supporting jig 20. Accordingly, the inner impregnation jig 30 can be stably disposed in the center hole 111.

Meanwhile, in the present embodiment, the supporting jig 20 and the inner impregnation jig 30 are provided as separate members, but the supporting jig 20 and the inner impregnation jig 30 may be integrally provided as necessary.

Meanwhile, referring to FIGS. 1B, 7, and 8 again, in the formation of the first impregnated portion according to one embodiment of the present disclosure, the inner impregnation jig 30 is disposed in the center hole 111 (S140), and the outer impregnation jig 40 is provided (S150). In the present embodiment, with the inner impregnation jig 30, the outer impregnation jig 40 is a component for molding the exterior of the first impregnated portion.

In this case, the outer impregnation jig 40 provided through the present embodiment may include an outer impregnation body 42, an injection hole circumferential portion 46, a corresponding hole circumferential portion 47, and an outer sealing member 48.

Referring to FIGS. 7 and 8, in the present embodiment, the outer impregnation body 42 may be provided as a member which extends in the vertical direction and of which a horizontal cross section has a ring shape. In addition, the impregnation space 43 of which an upper portion and a lower portion are open may be provided inside the outer impregnation body 42. In other words, the outer impregnation body 42 may be provided as a cylindrical member of which an upper side and a lower side are open.

In this case, according to the present embodiment, a side portion of the impregnation space 43 may be defined by an inner circumferential surface 42*a* of the outer impregnation body 42. When the impregnation space 43 is filled with an impregnating agent, the inner circumferential surface 42*a* of the outer impregnation body 42 may be in contact with the impregnating agent and form the exterior of the first impregnated portion.

Figure 12:
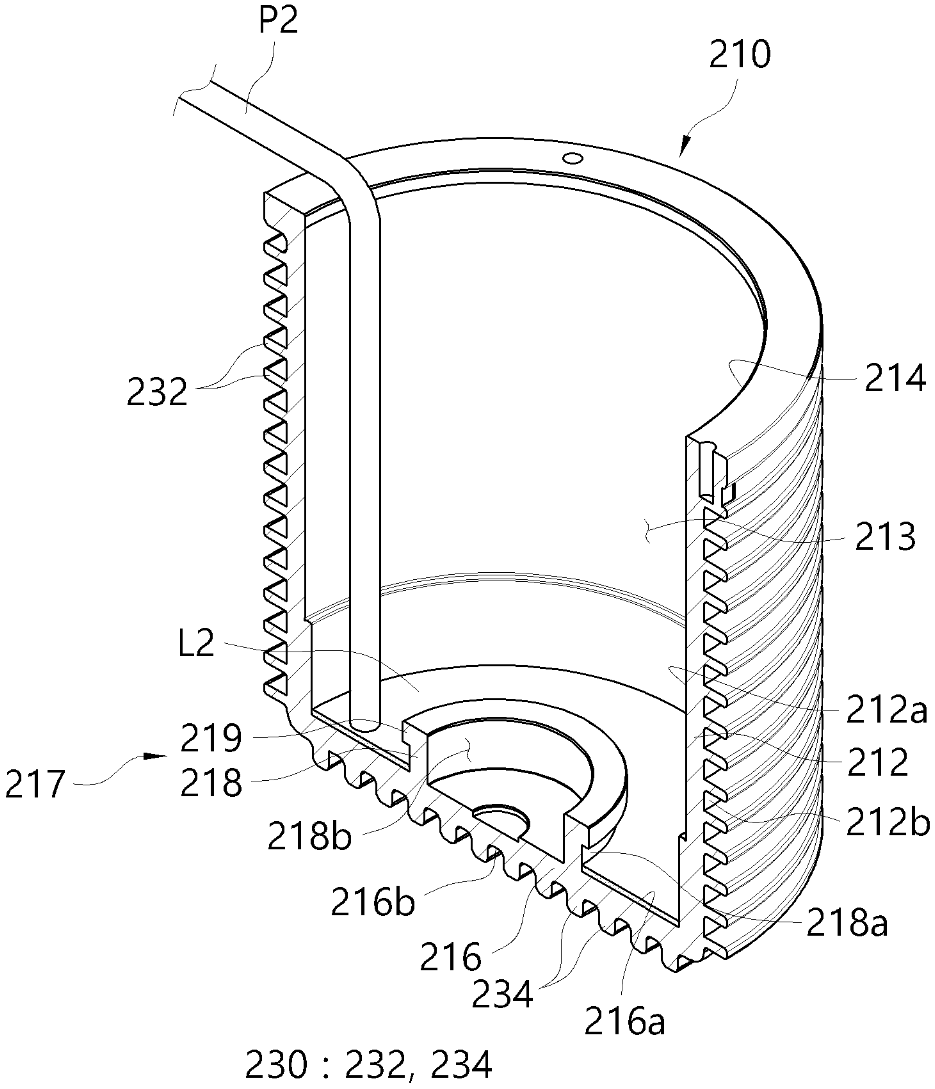
FIG. 12 is a cross-sectional perspective view for describing a process of injecting an impregnating agent into an accommodation space of a housing body according to an embodiment of the present disclosure.

The inner circumferential surface 42*a* of the outer impregnation body 42 may have a shape corresponding to an inner circumferential surface 212*a* of a motor housing 200 (illustrated in FIG. 12). More specifically, in the present embodiment, an inner diameter of the inner circumferential surface 42*a* of the outer impregnation body 42 may be smaller than or equal to a diameter of the inner circumferential surface 212*a* of a body portion 212 of the housing body 210. Accordingly, when the motor stator 100 (illustrated in FIG. 10) is disposed in the housing body 210 (illustrated in FIG. 12), an outer surface of the first impregnated portion may be close to the inner circumferential surface 212*a* of the housing body 210 (illustrated in FIG. 12), and an air gap can be minimized.

Meanwhile, in the present embodiment, an injection hole 44 through which the upper portion of the impregnation space 43 communicates with the outside may be provided on an upper portion of the outer impregnation body 42. The injection hole 44 is a component for injecting the impregnating agent, which will be described below, into the impregnation space 43. In this case, in the present embodiment, the injection hole circumferential portion 46 may be provided around a circumference of the injection hole 44.

According to the present embodiment, the reference surface 46*a* may be provided on the injection hole circumferential portion 46. The reference surface 46*a* may serve to indicate a target injection amount of the impregnating agent injected into the impregnation space 43. The function will be described below with reference to FIGS. 9A and 9B.

In the present embodiment, the reference surface 46*a* may be horizontally flat to be parallel to a level of the impregnating agent which will be described below. In addition, the reference surface 46*a* may extend in a circumferential direction of the injection hole 44.

In addition, according to the present embodiment, in order to prevent the impregnating agent injected into the impregnation space 43 from overflowing to the outside of the injection hole 44, the injection hole circumferential portion 46 may include a sidewall provided along an outer circumference of the reference surface 46*a*. The sidewall may protrude upward to be higher than the reference surface 46*a* to perform the above-described function.

In this case, in the present embodiment, the reference surface 46*a* of the injection hole circumferential portion 46 serves to indicate the target injection amount of the impregnating agent, but the target injection amount of the impregnating agent may be indicated in various manners. For example, the target injection amount may be indicated by an indication part including a reference line marked on the injection hole circumferential portion 46 or the inner circumferential surface 42*a* of the outer impregnation body 42.

Meanwhile, referring to FIG. 8, when the outer impregnation jig 40 is disposed close to an upper side of the supporting jig 20, the level of the reference surface 46*a* from the bottom surface 22*b* of the supporting body 22 spaced apart from the reference surface 46*a* in the vertical direction may be higher than or equal to a level of an upper end portion of the first end-turn portion 124 from the bottom surface 22*b* of the supporting body 22 in the vertical direction. This is for impregnating an entire outer surface of the first end-turn portion 124 with the impregnating agent by forming the level of the impregnating agent to be higher than or equal to the upper end portion of the first end-turn portion 124.

Referring to FIGS. 7 and 8 again, in the present embodiment, a corresponding hole 45 through which the lower portion of the impregnation space 43 communicates with the outside may be provided in a lower portion of the outer impregnation body 42. According to the present embodiment, the corresponding hole 45 is a component for providing a passage through which the first end-turn portion 124 protruding upward from the supporting jig 20 enters the impregnation space 43.

In addition, in the present embodiment, the corresponding hole circumferential portion 47 may be provided around the corresponding hole 45. In this case, according to the present embodiment, the corresponding hole circumferential portion 47 may have a shape to be engaged with the supporting hole circumferential portion 25 of the supporting jig 20 so that the outer impregnation jig 40 is stably disposed on the upper side of the supporting jig 20. More specifically, the corresponding hole circumferential portion 47 may have a stepped shape in an outward direction.

Meanwhile, referring to FIG. 8, the outer sealing member 48 may be provided on the inner circumferential surface 42*a* of the outer impregnation body 42. The outer sealing member 48 is a component for preventing the impregnating agent injected into the impregnation space 43 from leaking to the outside, extends in a circumferential direction of the inner circumferential surface 42*a* of the outer impregnation body 42, and has substantially a ring shape. For example, the outer sealing member 48 may be provided as an O-ring.

In this case, when the outer impregnation jig 40 is disposed close to the upper side of the supporting jig 20, a level of the outer sealing member 48 from the bottom surface 22*b* of the supporting body 22 spaced apart from the outer sealing member 48 in the vertical direction may be lower than or equal to the level of the upper end portion of the stator core 110 from the bottom surface 22*b* of the supporting body 22 spaced apart from the upper end portion of the stator core 110 in the vertical direction. This is for more effectively preventing the impregnating agent from leaking through between the inner circumferential surface 42*a* of the outer impregnation body 42 and the outer circumferential surface 110*a* of the stator core 110.

Meanwhile, in the present embodiment, the outer impregnation jig 40 is provided as a separate member from the supporting jig 20, but as necessary, the outer impregnation jig 40 and the supporting jig 20 may be integrally formed and provided as one member.

Referring again to FIGS. 1B, 7, and 8, in the formation of the first impregnated portion according to one embodiment of the present disclosure, the outer impregnation jig 40 is provided (S150), and the first end-turn portion 124 is disposed in the impregnation space 43 (S160).

In this case, according to the present embodiment, in operation S160 in which the first end-turn portion 124 is disposed in the impregnation space 43, an end portion of the first end-turn portion 124 may be disposed upward to face the injection hole 44 of the outer impregnation body 42.

In addition, the outer circumferential surface 110*a* of the stator core 110 may be disposed in contact with the inner circumferential surface 42*a* of the outer impregnation body 42. Accordingly, the impregnating agent injected into the impregnation space 43 can be prevented from leaking downward.

Referring to FIGS. 1B, 9A, and 9B again, in the forming of the first impregnated portion according to one embodiment of the present disclosure, the first end-turn portion 124 is disposed in the impregnation space 43 (S160), and the impregnating agent is injected into the impregnation space 43 (S170).

In this case, the impregnating agent may be formed of a fluid having a predetermined viscosity and fluidity. In addition, the impregnating agent may serve to emit heat so that heat generated by the stator core 110 and the coil 120 may be easily emitted to the outside. In this case, the impregnating agent can serve other functions in addition to the heat transfer function. For example, the impregnating agent may serve a function of mechanical protection from moisture, dust, vibrations, and the like, or may provide electrical insulation.

According to the present embodiment, a type of impregnating agent which may be used to form the impregnated portion is not particularly limited. For example, the impregnating agent may be a mixture including unsaturated polyester, which is commercially available from "NOROO Paint" of Korea and having the brand name of "DVB-2152 (solvent-free insulating varnish)," but is not limited thereto.

Hereinafter, in operation S170, the impregnating agent injected into the impregnation space 43 to form the first impregnated portion is referred to as a first impregnating agent L1. The first impregnating agent L1 may be injected through the injection hole 44 using a predetermined first pipe P1.

In this case, according to the present embodiment, in operation S170 of injecting the first impregnating agent L1 into the impregnation space 43, the impregnation space 43 may be filled with the first impregnating agent L1 from the lower portion of the impregnation space 43 due to gravity and the like. In addition, as the impregnation space 43 is filled with the first impregnating agent L1 from the lower portion to the upper portion of the impregnation space 43, a level of the first impregnating agent L1 may rise gradually.

At the same time, in the present embodiment, the first impregnating agent L1 may permeate between the inner circumferential surface 42*a* of the outer impregnation body 42 and the outer surface of the first end-turn portion 124. In addition, the first impregnating agent L1 may permeate between the outer circumferential surface 32*a* of the inner impregnation body 32 and the outer surface of the first end-turn portion 124. In order to help the permeation process, an additional process of applying a negative pressure or the like may be performed.

In this case, according to the present embodiment, since the outer circumferential surface 110*a* of the stator core 110 is in contact with the inner circumferential surface 42*a* of the outer impregnation body 42, an inner circumferential surface 111*a* of the center hole 111 is in contact with the outer circumferential surface 32*a* of the inner impregnation body 32, and the inner sealing member 34 and the outer sealing member 48 are provided, the first impregnating agent L1 injected into the impregnation space 43 may not leak downward from the impregnation space 43.

In addition, according to the present embodiment, in operation S170 of injecting the first impregnating agent L1 into the impregnation space 43, the first impregnating agent L1 may be injected so that the level of the first impregnating agent L1 formed in the impregnation space 43 reaches the reference surface 46*a* of the injection hole circumferential portion 46 so as to inject the first impregnating agent L1 in the impregnation space 43 as much as a target injection amount.

In this case, in the present embodiment, since the level of the reference surface 46*a* from the bottom surface 22*b* of the supporting body 22 spaced apart from the reference surface 46*a* in an upward direction is higher than the level of the upper end portion of the first end-turn portion 124 from the bottom surface 22*b* of the supporting body 22 in the upward direction, the entire first end-turn portion 124 may be impregnated with the first impregnating agent L1.

Referring again to FIGS. 1B, 9A, 9B, and 10, in the formation of the first impregnated portion according to one embodiment of the present disclosure, the first impregnating agent L1 is injected into the impregnation space 43 (S170), and the injected first impregnating agent L1 is cured and molded to form the first impregnated portion 132 (S180), and the jigs are separated from the first impregnated portion 132 (S190). In this case, process conditions for curing the first impregnating agent L1, for example, humidity, temperature, and the like, may be set in an appropriate range according to a type of the first impregnating agent L1.

Referring to FIGS. 9B and 10, in the present embodiment, a shape of the first impregnated portion 132 may be formed by the inner circumferential surface 42*a* of the outer impregnation body 42, the outer circumferential surface 32*a* of the outer impregnation body 32, and the reference surface 46*a*.

More specifically, the first impregnated portion 132 formed through the present embodiment may have a donut shape which has a predetermined height in the vertical direction and of which an upper surface is flat. That is, the first connecting hole 133 may be formed in the first impregnated portion 132 in the vertical direction. In this case, a lower portion of the first connecting hole 133 may be connected to the center hole 111 and an upper portion thereof may be open.

As described above, according to the method of manufacturing a motor stator according to one embodiment of the present disclosure, the shape of the first impregnated portion 132 may be controlled by forming the impregnation space 43 using the inner impregnation jig 30 and the outer impregnation jig 40 and injecting the first impregnating agent L1 into the formed impregnation space 43.

In particular, according to the present embodiment, shapes of an outer circumferential surface 132*a* and an upper surface 132*b* of the first impregnated portion 132 may be controlled to correspond to the inner circumferential surface 212*a* and a bottom surface 216*a* of the housing body 210, which will be described below, respectively. Accordingly, an air gap between the first impregnated portion 132 and the housing body 210 can be minimized, or an outer surface of the first impregnated portion 132 may be in contact with an inner surface of the housing body 210. Accordingly, heat generated by the stator core 110 and the coil 120 can be efficiently transferred to the housing body 210 through the first impregnated portion 132, and the heat-dissipating performance of the motor can be improved.

Meanwhile, referring to FIGS. 1B and 10 again, in the method of manufacturing a motor stator according to one embodiment of the present disclosure, the first impregnated portion 132 may be formed at an upper side of the stator core, and a second impregnated portion 134 may be formed at a lower side of the stator core. In the present embodiment, the second impregnated portion 134 may be formed outside the second end-turn portion 126.

In this case, according to the present embodiment, since the formation of the second impregnated portion 134 outside the second end-turn portion 126 may be the same as the formation of the first impregnated portion 132 outside the first end-turn portion 124, a description of the formation of the second impregnated portion 134 will be substituted by the description of the formation of the first impregnated portion 132.

Meanwhile, referring to FIG. 10, the second impregnated portion 134 formed according to one embodiment of the present disclosure and the first impregnated portion 132 may be symmetrically formed with respect to the stator core 110. However, the second impregnated portion 134 may be formed in a different shape or formed of a different material from the first impregnated portion 132 as necessary. For example, the second impregnated portion 134 may be formed using an impregnation jig having a different shape or using a different type of impregnating agent.

Hereinafter, the method of manufacturing a motor according to one embodiment of the present disclosure will be continuously described with respect to the other drawings.

Figure 11:
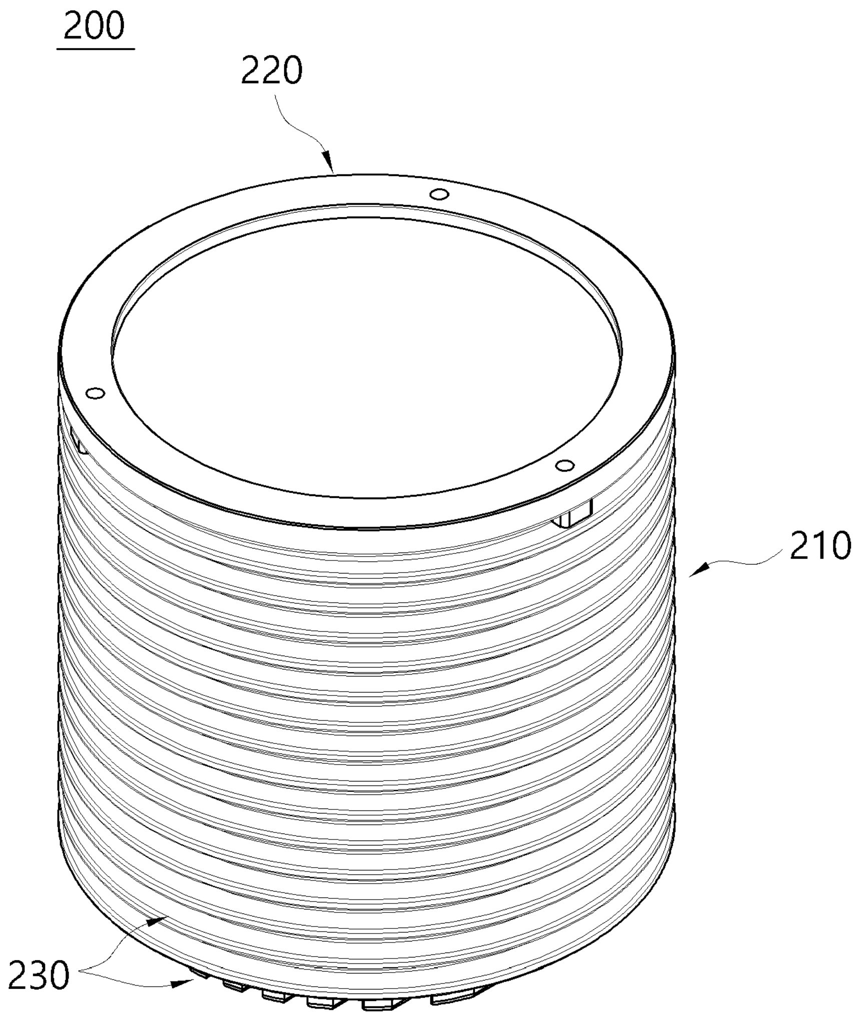
FIG. 11 is a top perspective view illustrating a motor housing according to an embodiment of the present disclosure.
Figure 13:
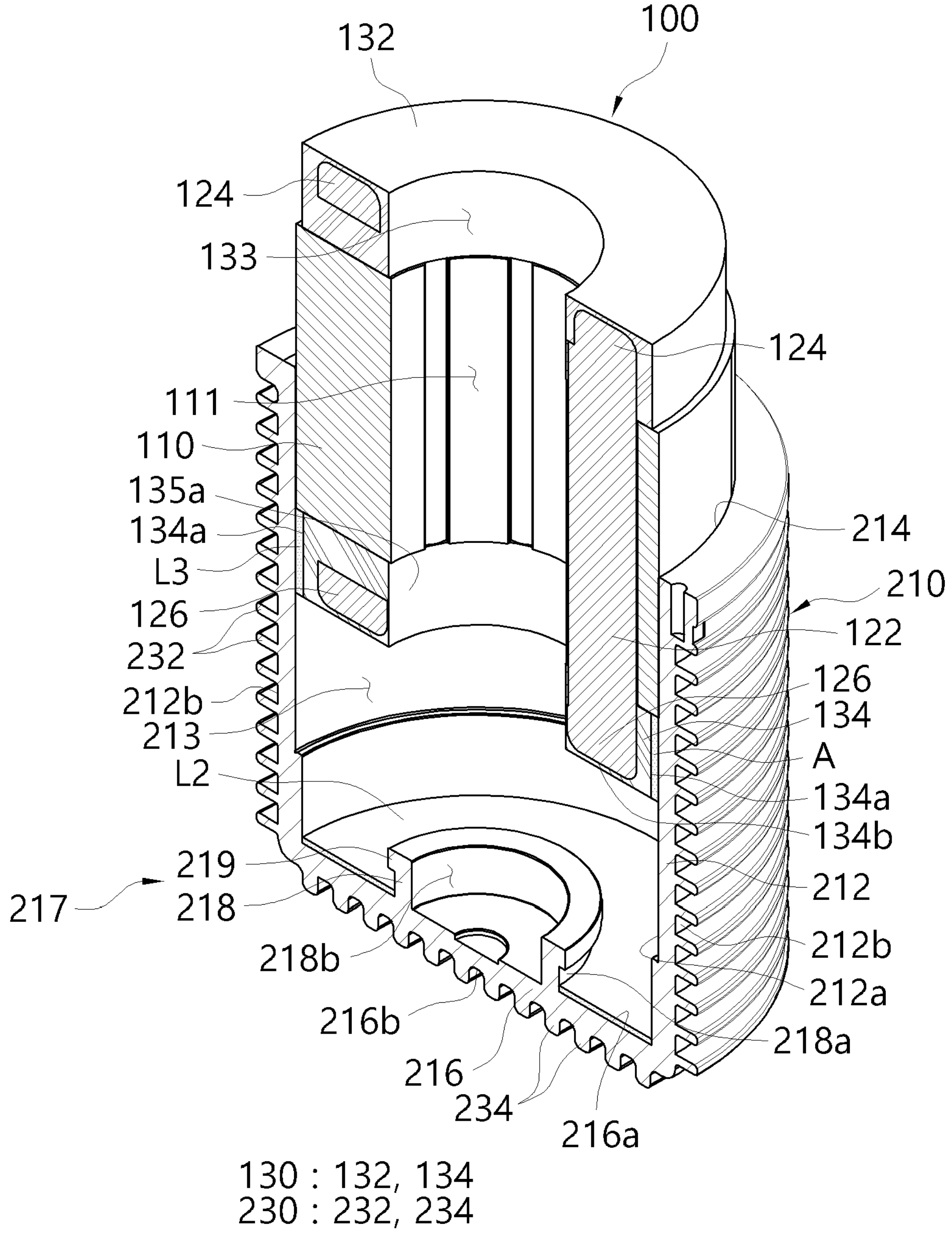
FIG. 13 is a cross-sectional perspective view for describing a process of disposing a motor stator in an accommodation space of a housing body according to an embodiment of the present disclosure.
Figure 14:
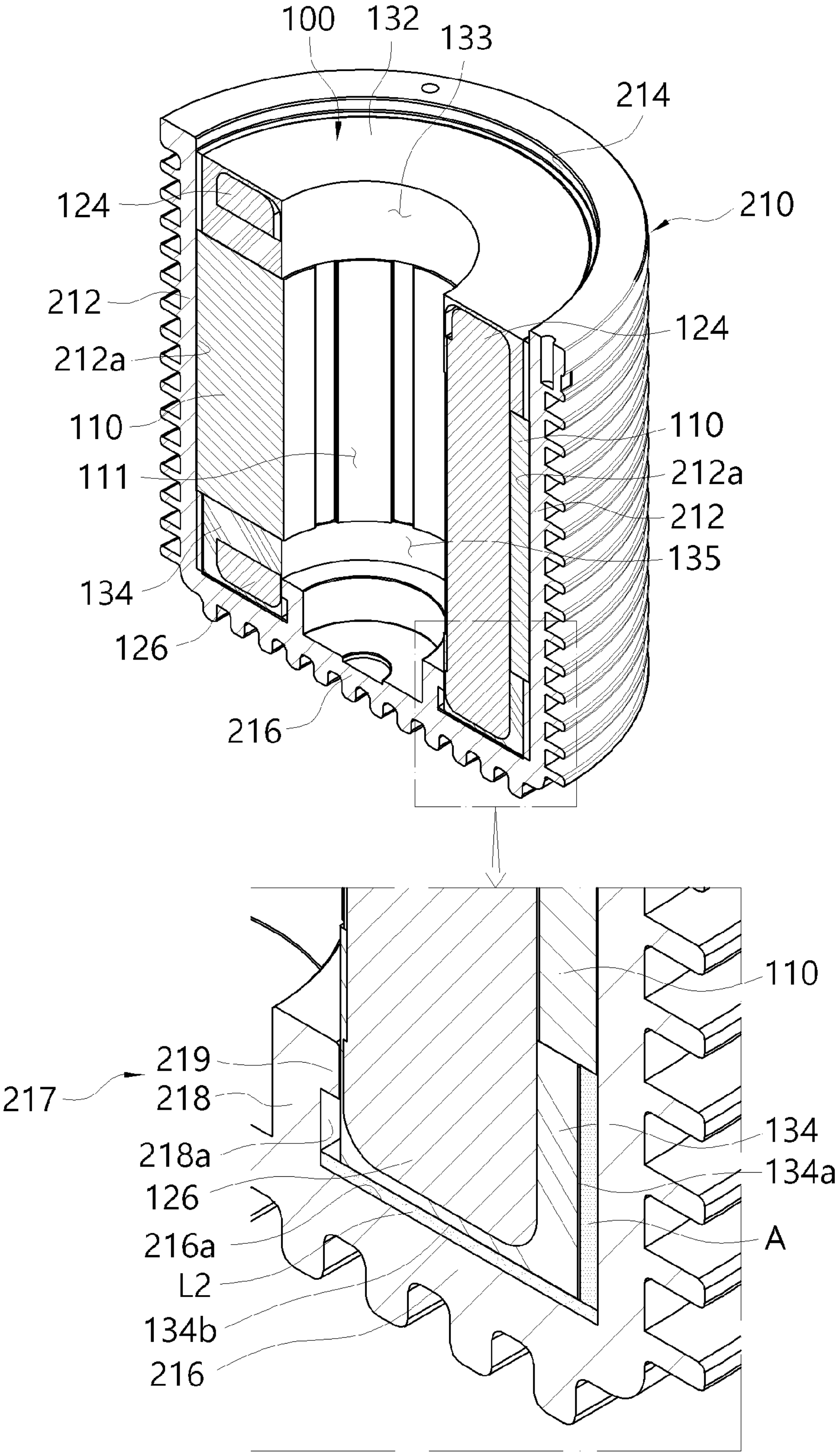
FIG. 14 is a cross-sectional perspective view for describing a process of permeating a heat sink liquid and an impregnating agent between an outer surface of a second impregnated portion and an inner surface of a housing body according to an embodiment of the present disclosure.
Figure 15A:
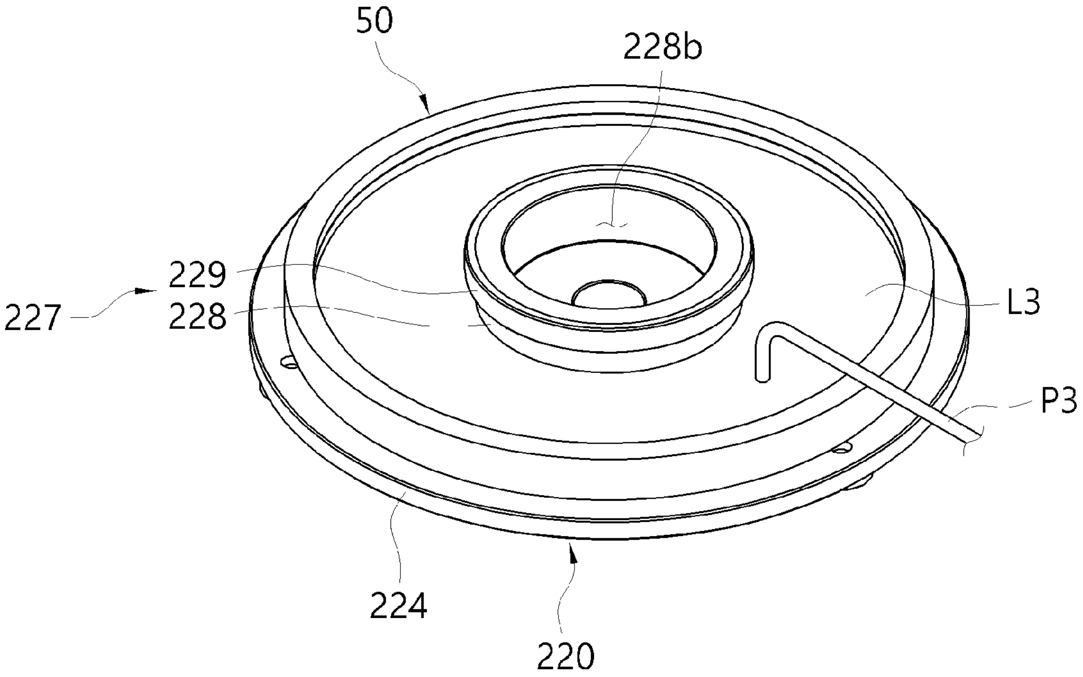
FIG. 15A is a perspective view for describing a process of injecting an impregnating agent onto one surface of a housing cover according to an embodiment of the present disclosure.
Figure 15B:
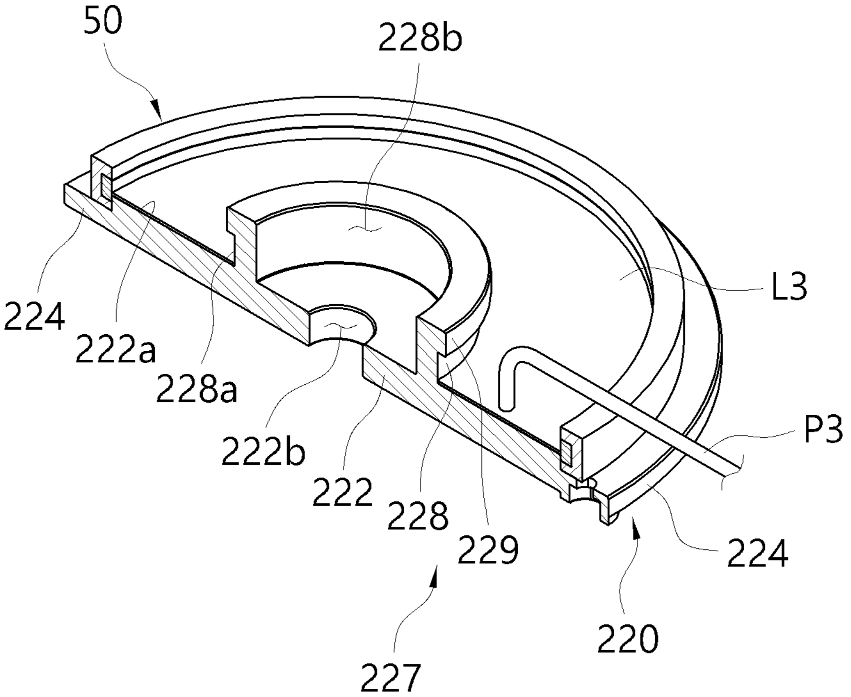
FIG. 15B is a vertical cross-sectional view illustrating the housing cover and a leakage prevention jig illustrated in FIG. 15A.
Figure 16A:
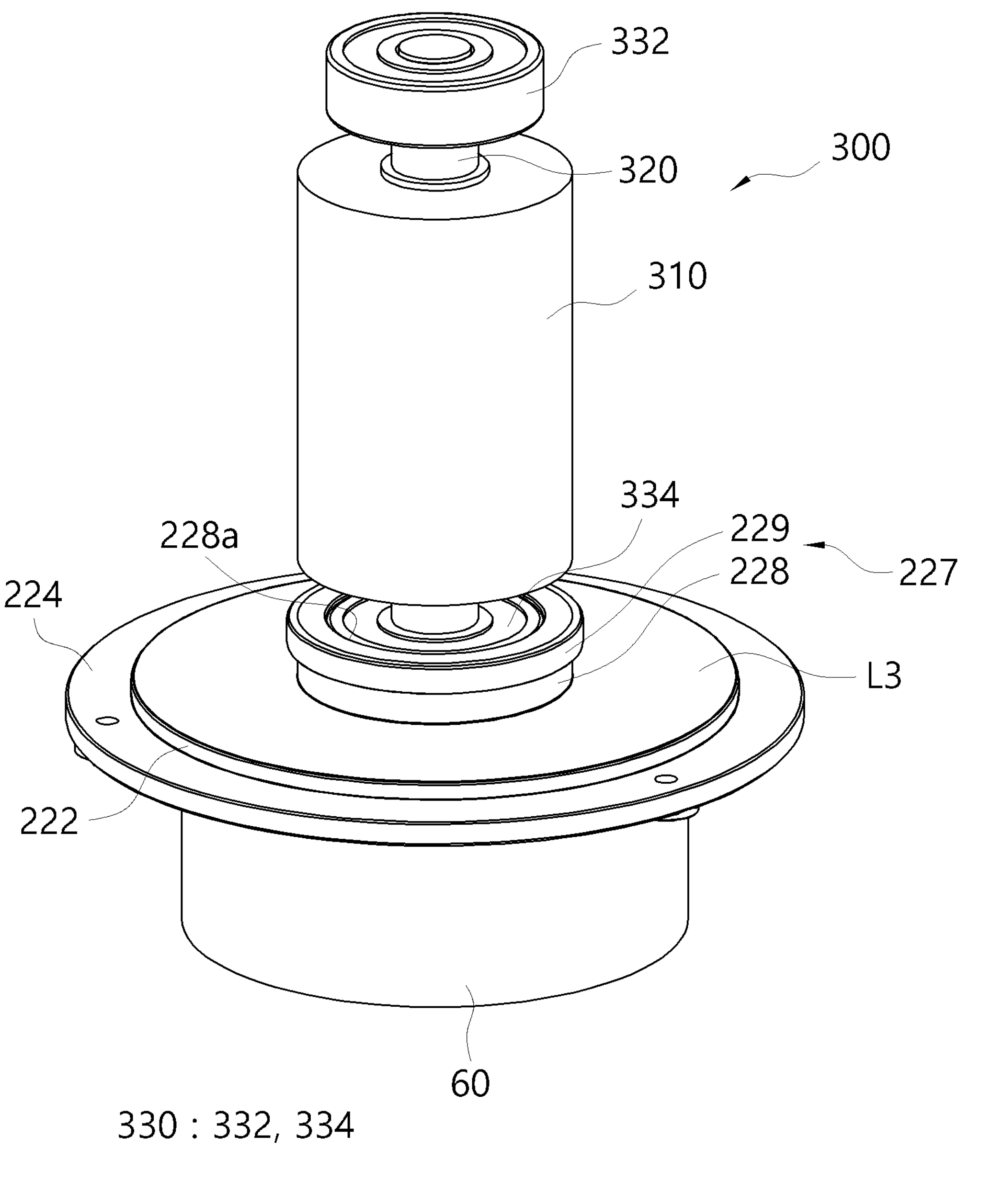
FIG. 16A is a top perspective view illustrating a motor rotor fixed by a fixing jig according to an embodiment of the present disclosure.
Figure 16B:
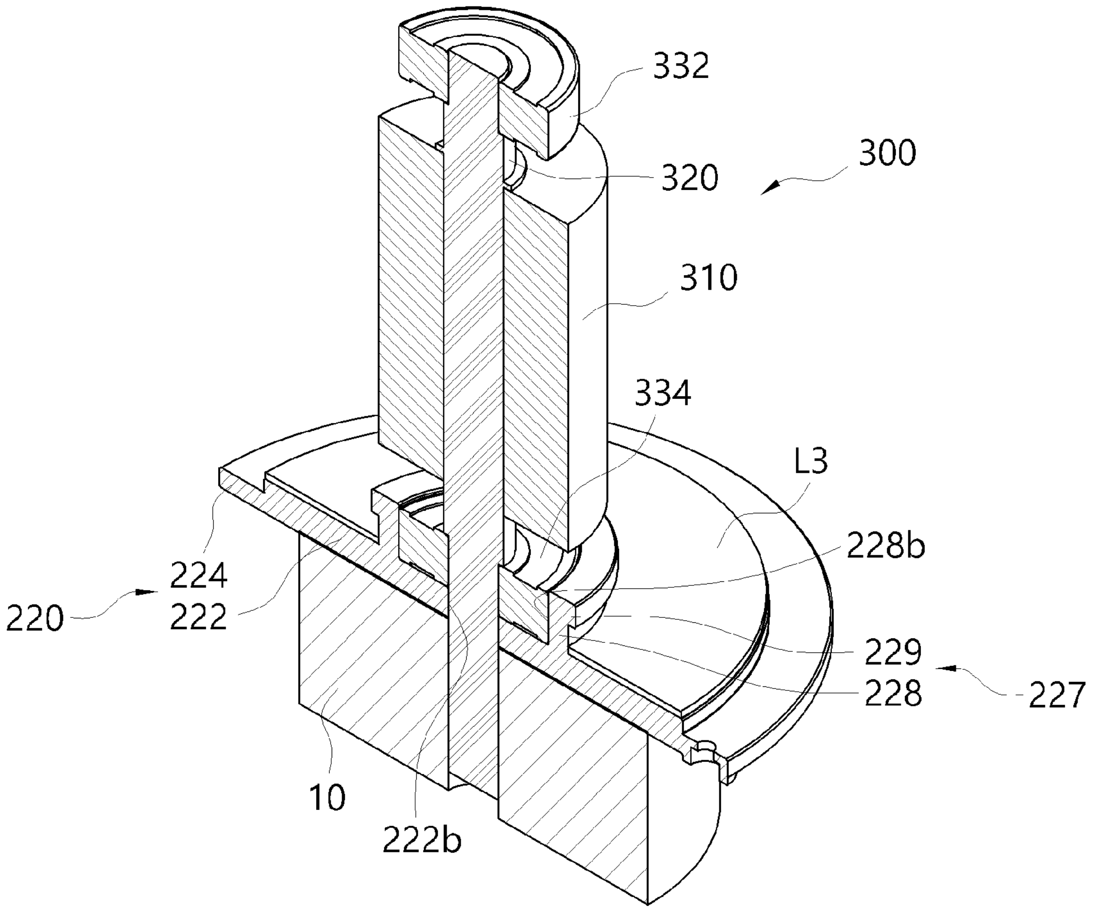
FIG. 16B is a vertical cross-sectional view illustrating the motor rotor and the fixing jig illustrated in FIG. 16A.
Figure 17:
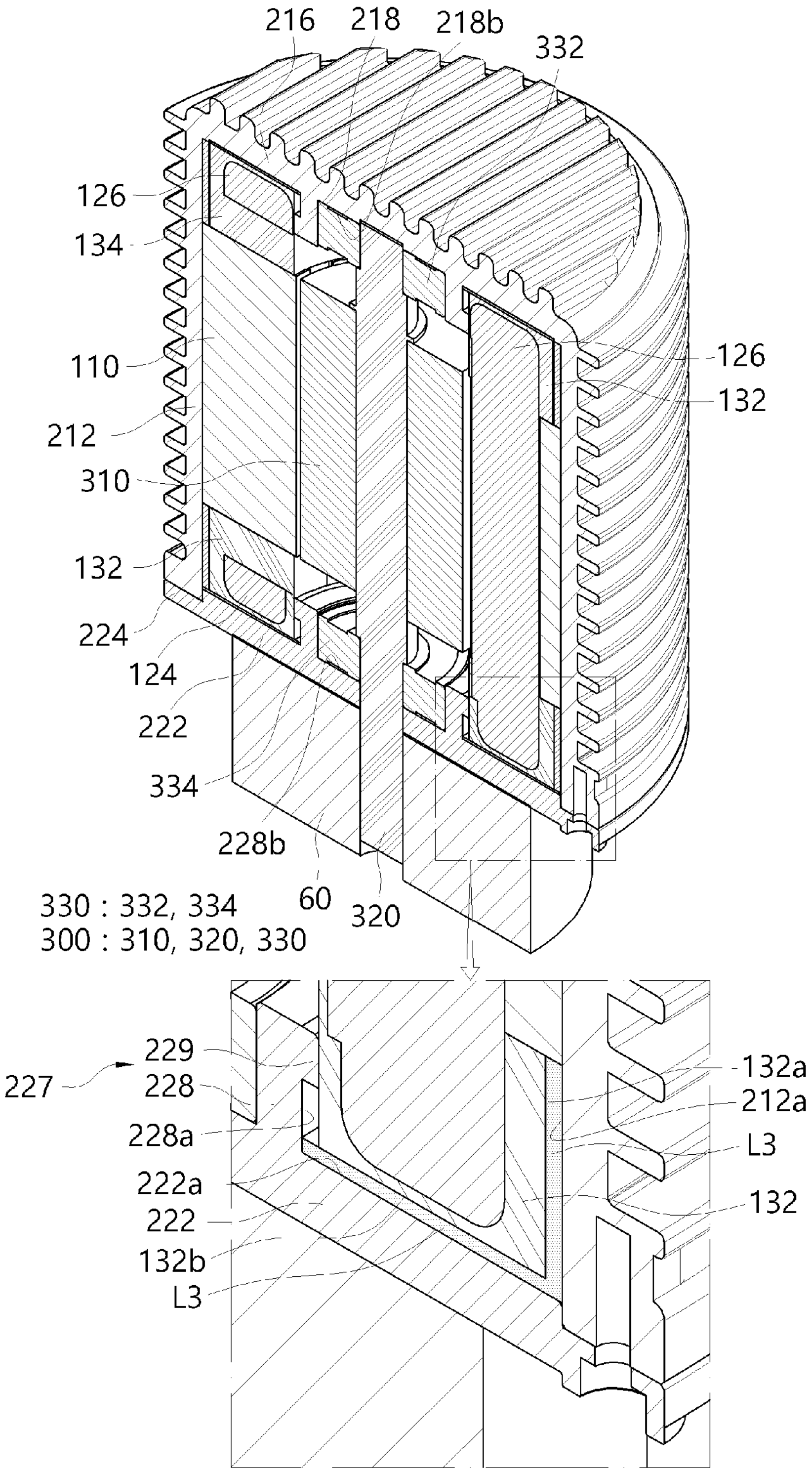
FIG. 17 is a view for describing a process of permeating an impregnating agent between an outer surface of a first impregnated portion and an inner surface of a motor housing according to an embodiment of the present disclosure.
Figure 18:
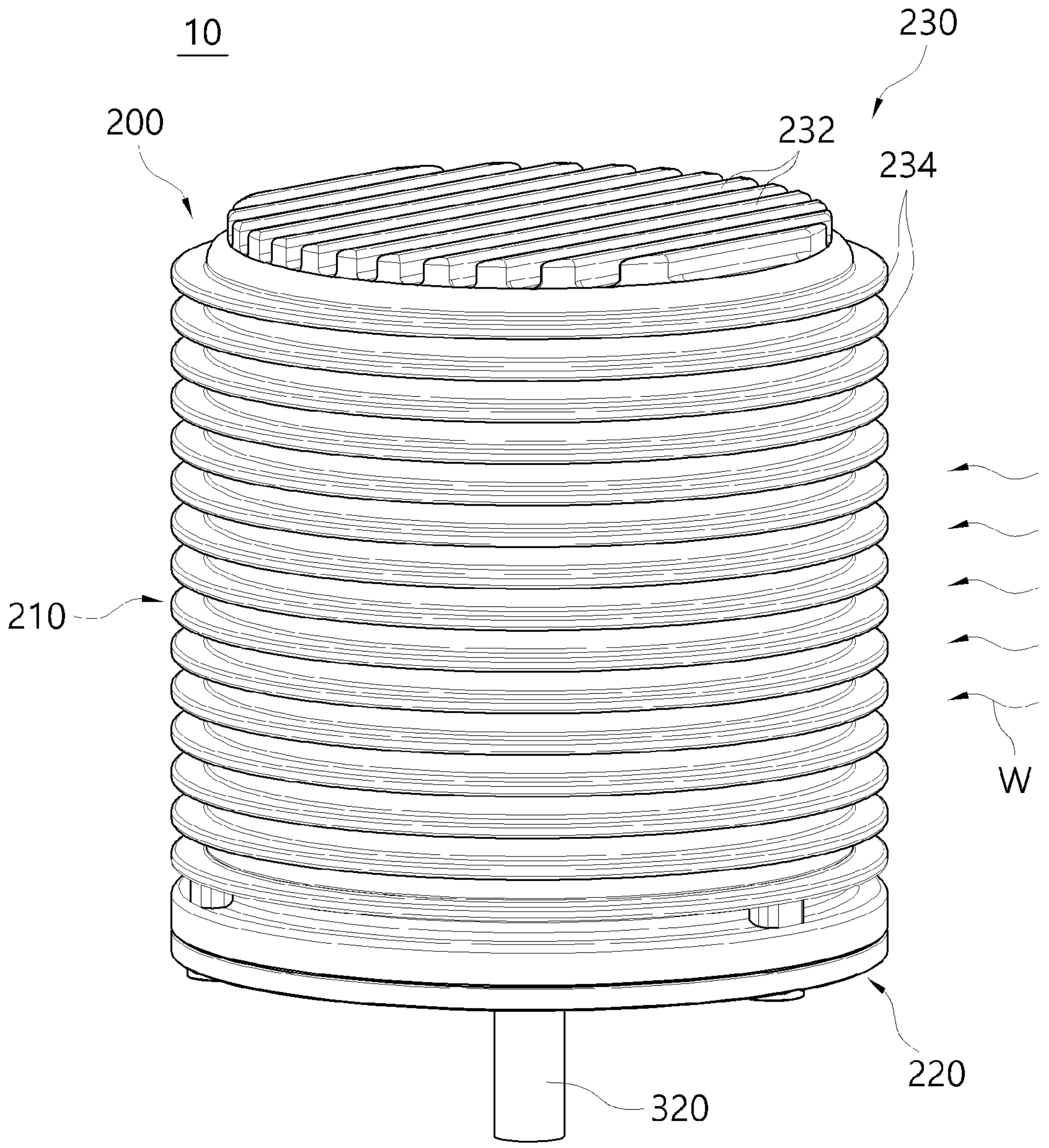
FIG. 18 is a top perspective view illustrating a motor according to an embodiment of the present disclosure.

FIG. 11 is a top perspective view illustrating the motor housing provided through the method of manufacturing a motor according to one embodiment of the present disclosure. FIG. 12 is a view for describing a process of injecting the impregnating agent into the accommodation space according to the method of manufacturing a motor according to one embodiment of the present disclosure, wherein a vertical cross section of the housing body is illustrated. FIG. 13 is a view for describing a process in which the motor stator is disposed in the accommodation space according to the method of manufacturing a motor according to one embodiment of the present disclosure, wherein vertical cross sections of the housing body and the motor stator are illustrated. FIG. 14 is a view for describing a process in which a heat sink liquid and the impregnating agent permeate between an outer surface of the second impregnated portion and the inner surface of the housing body according to the method of manufacturing a motor according to one embodiment of the present disclosure. FIG. 15A is a view for describing a process of injecting the impregnating agent onto one surface of the housing cover according to the method of manufacturing a motor according to one embodiment of the present disclosure. FIG. 15B is a vertical cross-sectional view illustrating the housing cover and a leakage prevention jig illustrated in FIG. 15A. FIG. 16A is a top perspective view illustrating the motor rotor fixed by a fixing jig according to the method of manufacturing a motor according to one embodiment of the present disclosure. FIG. 16B is a vertical cross-sectional view illustrating the motor rotor and the fixing jig illustrated in FIG. 16A. FIG. 17 is a view for describing a process in which the impregnating agent permeates between the outer surface of the first impregnated portion and an inner surface of the motor housing according to the method of manufacturing a motor according to one embodiment of the present disclosure. FIG. 18 is a top perspective view illustrating a motor manufactured through the method of manufacturing a motor according to one embodiment of the present disclosure.

Referring to FIGS. 1A, 10, 16A, and 16B, in the method of manufacturing a motor according to one embodiment of the present disclosure, the motor stator 100 is provided (S100), and the motor rotor 300 is provided (S200).

The motor rotor 300 provided through the present embodiment may include a cylindrical rotor core 310 extending in the vertical direction, a rotary shaft 320 extending in the vertical direction and coupled to pass through the rotor core 310, and bearings 330 provided around the rotary shaft 320. In the present embodiment, the bearings 330 may be provided as ball bearings.

In this case, according to the present embodiment, the bearings 330 may include a first bearing 332 and a second bearing 334. The first bearing 332 may be coupled to an upper end portion of the rotary shaft 320. The second bearing 334 may be coupled to a portion spaced upward from a lower end portion of the rotary shaft 320. This is because the lower end portion of the rotary shaft 320 may be coupled to another device for receiving power generated by the motor. Positions of the bearings 330 may be appropriately changed as necessary.

Referring to FIGS. 1A, 11, and 12 again, in the method of manufacturing a motor according to one embodiment of the present disclosure, the motor rotor is provided (S200), and the housing body 210 is provided (S300). In the present embodiment, the housing body 210 with a heat sink fin 230 and a housing cover 220, which will be described below, may constitute the motor housing 200.

Referring to FIGS. 11 and 12, the housing body 210 provided through the present embodiment may include the body portion 212, a bottom portion 216, and a first pedestal part 217.

In this case, in the present embodiment, the body portion 212 may be provided as a cylindrical member vertically extending and having an accommodation space 213 therein. In this case, the accommodation space 213 is a space for accommodating the motor stator 100 and the motor rotor 300. A side portion of the accommodation space 213 may be defined by the inner circumferential surface 212*a* of the body portion 212.

In addition, in the present embodiment, an insertion hole 214 which is open upward may be provided in an upper portion of the body portion 212. The accommodation space 213 provided in the body portion 212 may communicate with the outside through the insertion hole 214.

Meanwhile, in the present embodiment, the bottom portion 216 may be provided at a lower side of the body portion 212. The bottom portion 216 may be formed as a member having a disc shape which covers the lower side of the body portion 212. Accordingly, a lower portion of the accommodation space 213 may be closed by the bottom portion 216.

In this case, in the present embodiment, the bottom portion 216 may include the bottom surface 216*a* facing upward toward the accommodation space 213. That is, the lower portion of the accommodation space 213 may be defined by the bottom surface 216*a* of the bottom portion 216.

According to the present embodiment, the first pedestal part 217 may be provided in a central portion of the bottom surface 216*a* when viewed in the vertical direction. In this case, the first pedestal part 217 may include a first pedestal

218 protruding upward to a predetermined height from the bottom surface 216*a* and having a cylindrical shape and a first contact protrusion 219 protruding outward from an end portion of the first pedestal 218.

In the present embodiment, the first pedestal 218 may include a column-shaped circumferential surface 218*a*. In addition, an outer diameter of the first pedestal 218 may be smaller than an inner diameter of a second connecting hole 135 so that the first pedestal 218 enters the second connecting hole 135 (illustrated in FIG. 10) of the second impregnated portion 134 (illustrated in FIG. 13).

In addition, in the present embodiment, a first bearing groove 218*b* which is open upward may be provided inside the first pedestal 218. The first bearing 332 (illustrated in FIG. 16A) of the motor rotor 300 (illustrated in FIG. 16A) may be disposed in the first bearing groove 218*b*.

In this case, in the present embodiment, the first contact protrusion 219 may be provided along a circumference of the first pedestal 218. In addition, the first contact protrusion 219 may protrude to be in contact with an inner circumferential surface 135*a* of the second connecting hole 135 (illustrated in FIG. 13) of the second impregnated portion 134 (illustrated in FIG. 13). This is for stably supporting the second impregnated portion 134 (illustrated in FIG. 10) and fixing a position of the second impregnated portion 134 (illustrated in FIG. 10) by the first pedestal part 217.

Meanwhile, referring to FIGS. 11 and 12 again, the heat sink fin 230 may be provided on an outer side of the housing body 210 provided through the present embodiment. The heat sink fin 230 is a component for more effectively emitting heat generated by the core and the coil of the motor and transferred to the housing body 210 to the outside. To this end, the heat sink fin 230 may be formed of a material such as a metal with a high heat transfer rate but is not limited thereto.

In the present embodiment, the heat sink fin 230 may include a body side heat sink fin 232 and a bottom side heat sink fin 234. According to the present embodiment, the body side heat sink fin 232 may protrude outward from an outer surface 212*b* of the body portion 212. In addition, the body side heat sink fin 232 may extend in a circumferential direction of the body portion 212. In other words, the body side heat sink fin 232 may have a ring shape surrounding the body portion 212 when viewed in the vertical direction.

In this case, according to the present embodiment, the body side heat sink fin 230 may be provided as a plurality of body side heat sink fins 230. In addition, the plurality of body side heat sink fins 230 may be disposed to be spaced a predetermined distance from each other in the vertical direction.

Meanwhile, in the present embodiment, the bottom side heat sink fin 234 may be formed to protrude downward from a lower surface 216*b* of the bottom portion 216. In addition, the bottom side heat sink fin 234 may extend in the horizontal direction. In this case, in the present embodiment, the bottom side heat sink fin 234 may be provided as a plurality of bottom side heat sink fins 234. In addition, the plurality of bottom side heat sink fins 234 may be disposed to be spaced a predetermined distance from each other.

As described above, according to the method of manufacturing a motor according to one embodiment of the present disclosure, since the heat sink fin 230 is provided on the outer side of the housing body 210 to effectively emit heat transferred to the housing body 210, the heat-dissipating performance of the motor can be improved.

Meanwhile, referring to FIGS. 1A, 11, and 13 again, in the method of manufacturing a motor according to one embodiment of the present disclosure, the housing body 210 is provided (S300), and an outer surface of the second impregnated portion 134 (S400) is coated with a heat sink liquid A. In the present embodiment, various types of mixtures may be used as the heat sink liquid A, and the types are not particularly limited.

When the motor stator 100 is inserted into the accommodation space 213 of the housing body 210, the heat sink liquid A may serve to fill between an inner wall of the housing body 210 and the outer surface of the second impregnated portion 134. Accordingly, the generation of an air gap between the inner wall of the housing body 210 and the outer surface of the second impregnated portion 134 can be minimized, and the heat-dissipating performance of the motor can be improved.

In operation S400 of coating with the heat sink liquid A according to the present embodiment, an outer circumferential surface 134*a* of the second impregnated portion 134 may be coated with the heat sink liquid A. However, another portion of the second impregnated portion 134 or on an outer surface of the stator core 110 may be coated with the heat sink liquid A as necessary.

Referring to FIGS. 1A, 10, 12 again, in the method of manufacturing a motor according to one embodiment of the present disclosure, after coating with the heat sink liquid A (illustrated in FIG. 14) (S400), and the motor stator 100 is disposed in the accommodation space 213 of the housing body 210 (S500).

In this case, referring to FIGS. 1C and 12, in operation S500 in which the motor stator according to the present embodiment is disposed in the accommodation space 213, an impregnating agent is injected into the accommodation space 213 (S510). Hereinafter, the impregnating agent injected into the accommodation space 213 is referred to as a second impregnating agent L2.

In this case, the second impregnating agent L2 may be the same type of impregnating agent as that of the first impregnating agent L1 (illustrated in FIG. 9A) and may be another type of impregnating agent having different characteristics as necessary. The second impregnating agent L2 may be injected through the insertion hole 214 using a predetermined second pipe P2.

In the present embodiment, in operation S510 of injecting the second impregnating agent L2 into the accommodation space 213, the second impregnating agent L2 may be injected onto the bottom surface 216*a* of the bottom portion 216. The second impregnating agent L2 is injected to fill between the outer surface of the first impregnated portion and the inner surface of the housing body 210. In consideration of the injection purpose of the second impregnating agent L2, an injection amount of the second impregnating agent L2 may be adjusted.

Referring to FIGS. 1C, 13, and 14 again, in operation S500 in which the motor stator 100 according to one embodiment of the present disclosure is disposed in the accommodation space 213, the second impregnating agent L2 is injected into the accommodation space 213 (S510), and an end portion of the second impregnated portion 134 is disposed to face the bottom surface 216*a* of the housing body 210 (S520). In addition, the motor stator 100 is inserted into the accommodation space 213 through the insertion hole 214 (S530).

In operation S530 of inserting the motor stator 100 according to the present embodiment, as the motor stator 100 is inserted into the accommodation space 213, the end portion of the second impregnated portion 134 may be disposed close to the bottom surface 216*a* of the bottom portion 216.

In this case, according to the present embodiment, since the second impregnating agent L2 has a predetermined viscosity and fluidity, the second impregnating agent L2 may permeate and fill between a lower surface 314*b* of the second impregnated portion 134 and the bottom surface 216*a* of the bottom portion 216. Accordingly, an air gap between the lower surface 314*b* of the second impregnated portion 134 and the bottom surface 216*a* of the bottom portion 216 can be minimized, and the heat-dissipating performance of the motor can be improved.

In addition, according to the present embodiment, although not illustrated in the drawings, the second impregnating agent L2 permeates and fills between the outer circumferential surface 134*a* of the second impregnated portion 134 and the inner circumferential surface 212*a* of the body portion 212. The above-described action may be performed together with the heat sink liquid A with which the outer circumferential surface 134*a* of the second impregnated portion 134 is coated. Accordingly, an air gap between the outer circumferential surface 134*a* of the second impregnated portion 134 and the inner circumferential surface 212*a* of the body portion 212 can be minimized, and the heat-dissipating performance of the motor can be improved.

In addition, according to the present embodiment, although not illustrated in the drawings, the second impregnating agent L2 may be introduced between an outer circumferential surface 218*a* of the first pedestal 218 and the inner circumferential surface 135*a* of the second connecting hole 135. That is, an extra space which may accommodate an excessive amount of the second impregnating agent L2 may be provided between the outer circumferential surface 218*a* of the first pedestal 218 and the inner circumferential surface 135*a* of the second connecting hole 135. Accordingly, even when a slight large amount of the second impregnating agent L2 is injected into the accommodation space 213, a coupling tolerance between the motor stator 100 and the motor housing 200 can be minimized, and the heat-dissipating performance can be improved.

Referring again to FIGS. 1C and 14, in operation S500 in which the motor stator 100 is disposed in the accommodation space 213 according to one embodiment of the present disclosure, the motor stator 100 is inserted into the accommodation space 213 (S530), and the second impregnating agent L2 is cured to form a second heat sink portion (S540). In this case, in the present embodiment, the second heat sink portion is a solid portion formed by curing the second impregnating agent L2 or the heat sink liquid A between the outer surface of the second impregnated portion 134 and the inner surface of the housing body 210.

As described above, according to the present embodiment, an air gap between an outer surface of the second end-turn portion 126 and the inner surface of the housing body 210 can be minimized, and in addition, since the second impregnated portion 134 and the second heat sink portion, which have higher heat transfer rates than air, may be formed, the heat-dissipating performance of the motor can be significantly improved.

Referring again to FIGS. 1A, 11, 15A, and 15B, in the method of manufacturing a motor according to one embodiment of the present disclosure, the motor stator is disposed in the accommodation space (S500), and the housing cover 220 is provided (S600). As described above, the housing cover 220 with the housing body 210 and the heat sink fin 230 may constitute the motor housing 200.

Referring to FIGS. 15A and 15B, the housing cover 220 provided through the present embodiment may include a cover part 222, a circumferential portion 224, and a second pedestal part 227. In the present embodiment, the cover part 222 may be formed as a member having a disc shape having a predetermined thickness to close an upper side of the accommodation space 213 (illustrated in FIG. 12) of the housing body 210 (illustrated in FIG. 12).

In the present embodiment, the cover part 222 may include a cover surface 222*a* facing upward toward the accommodation space 213 (illustrated in FIG. 12). That is, when the housing body 210 is coupled to the housing cover 220, an upper portion of the accommodation space 213 (illustrated in FIG. 12) may be defined by the cover surface 222*a*.

According to one embodiment of the present disclosure, the circumferential portion 224 may be provided on a circumference of the cover part 222. The circumferential portion 224 may protrude outward from the circumference of the cover part 222. In addition, the circumferential portion 224 may be formed to be stepped outward. Accordingly, the assemblability between the housing body 210 (illustrated in FIG. 12) and the housing cover 220 and the airtightness of the accommodation space 213 can be improved.

Meanwhile, according to the present embodiment, when viewed from above, the second pedestal part 227 may be provided in a center of the cover surface 222*a*. In the present embodiment, the second pedestal part 227 may include a second pedestal 228 and a second contact protrusion 229.

In the present embodiment, the second pedestal 228 may have a cylindrical shape protruding upward to a predetermined height from the cover surface 222*a*. The second pedestal 228 may include a column-shaped circumferential surface 228*a*. In addition, an outer diameter of the second pedestal 228 may be smaller than an inner diameter of the first connecting hole 133 (illustrated in FIG. 10) so that the second pedestal 228 may enter the first connecting hole 133 of the first impregnated portion 132 (illustrated in FIG. 10).

In addition, in the present embodiment, a second bearing groove 228*b* which is open upward may be provided inside the second pedestal 228. The second bearing 334 (illustrated in FIG. 16A) of the motor rotor 300 (illustrated in FIG. 16A) may be disposed in the second bearing groove 228*b*.

Meanwhile, in the present embodiment, the second contact protrusion 229 protruding outward may be provided on an end portion of the second pedestal 228. In this case, the second contact protrusion 229 may be provided along a circumference of the second pedestal 228.

In addition, in the present embodiment, the second contact protrusion 229 may protrude to be in contact with the inner circumferential surface 133*a* of the first connecting hole 133 (illustrated in FIG. 10) of the first impregnated portion 132 (illustrated in FIG. 10). This is for stably supporting the first impregnated portion 132 (illustrated in FIG. 10) and fixing a position of the first impregnated portion 132 by the second pedestal part 227.

Meanwhile, according to the present embodiment, a rotary shaft through hole 222*b* may be provided in a bottom surface of the second bearing groove 228*b*. The rotary shaft through hole 222*b* is a hole through which the rotary shaft 320 (illustrated in FIG. 16A) passes. One end portion of the rotary shaft 320 (illustrated in FIG. 16A) may protrude outward from the motor housing 200 (illustrated in FIG. 11) through the rotary shaft through hole 222*b* and may be operationally connected to another device.

Referring to FIG. 1A again, in the method of manufacturing a motor according to one embodiment of the present disclosure, the housing cover is provided (S600), the motor rotor is disposed in the center hole of the motor stator, and the accommodation space is closed by the housing cover (S700).

In this case, referring to FIGS. 1D, 15A, and 15B, according to one embodiment of the present disclosure, in operation S700 of closing the accommodation space using the housing cover 220, an impregnating agent is injected onto the cover surface 222*a* of the housing cover 220 (S710).

Hereinafter, the impregnating agent injected onto the cover surface 222*a* is referred as a third impregnating agent L3. In the present embodiment, the third impregnating agent L3 may be the same type as the first impregnating agent L1 (illustrated in FIG. 9A) or the second impregnating agent L2 (illustrated in FIG. 12), and another type may be used for the third impregnating agent L3 as necessary. The third impregnating agent L3 may be injected using a predetermined third pipe P3.

In this case, according to the present embodiment, in operation S710 of injecting the third impregnating agent L3, a leakage prevention jig 50 may be provided and installed on the housing cover 220 to prevent the injected third impregnating agent L3 from flowing out to the outside of the cover surface 222*a*.

In the present embodiment, the leakage prevention jig 50 may have a ring shape when viewed from above and may have a predetermined height in the vertical direction. In addition, an upper end portion of the leakage prevention jig 50 is formed to protrude upward from the cover surface 222*a* to form a predetermined end step on a circumference of the cover surface 222*a*.

Accordingly, in the method of manufacturing a motor according to the present embodiment, the leakage prevention jig 50 is used to prevent the third impregnating agent L3 from flowing out to the outside of the cover surface 222*a* in a process of injecting the third impregnating agent L3. When the injection of the third impregnating agent L3 is completed, the leakage prevention jig 50 may be separated from the housing cover 220.

Referring to FIGS. 1D, 16A, and 16B again, in operation S700 of closing the accommodation space according to one embodiment of the present disclosure, the third impregnating agent L3 is injected onto the cover surface 222*a* of the housing cover 220 (S710), and the housing cover 220 is coupled to the motor rotor 300.

In the present embodiment, in the coupling of the housing cover 220 and the motor rotor 300, the motor rotor 300 is arranged so that the first bearing 332 and the second bearing 334 are arranged in the vertical direction. In addition, the second bearing 334 is disposed in the second bearing groove 228*b*, and the lower end portion of the rotary shaft 320 is disposed to pass through the rotary shaft hole 222*b* and protrude downward.

In addition, in operation S700 of closing the accommodation space according to one embodiment of the present disclosure, the housing cover 220 is coupled to the motor rotor 300, a fixing jig 60 is provided, and the housing cover 220 and the motor rotor 300 are fixedly coupled to the fixing jig 60.

More specifically, the fixing jig 60 provided through the present embodiment may include an upper surface. In addition, the upper surface of the fixing jig 60 may be provided to be flat to be in contact with a lower surface of the cover part 222 of the housing cover 220. In this case, a fixing hole, into which the lower end portion of the rotary shaft 320 may be inserted, may be formed in the upper surface of the fixing jig 60.

In the fixedly coupling of the housing cover 220 and the motor rotor 300 to the fixing jig 60 according to one embodiment of the present disclosure, the lower end portion of the rotary shaft 320 may be fitted into the fixing hole of the fixing jig until the lower surface of the cover part 222 is supported by the upper surface of the fixing jig 60. Accordingly, since positions of the housing cover 220 and the motor rotor 300 may be stably fixed and the housing cover 220 and the motor rotor 300 may be supported by the fixing jig 60, operations, which will be described below, can be performed accurately and quickly.

Referring to FIGS. 1D and 17 again, in operation S700 of closing the accommodation space 213 using the housing cover 220, an end portion of the first impregnated portion 132 is disposed to face the cover surface 222*a* of the housing cover 220 (S720), and the housing cover 220 is disposed close to the housing body 210 (S730) so that the motor rotor 300 is disposed in the center hole 111 of the stator core 110.

In this case, in the present embodiment, in operation S730 in which the housing cover 220 is disposed close to the housing body 210, the first bearing 332 of the motor rotor 300 may be disposed in the first bearing groove 218*b* of the first pedestal 218.

In addition, in operation S730 in which the housing cover 220 is disposed close to the housing body 210 according to one embodiment of the present disclosure, since the motor rotor 300 enters the center hole 111 of the stator core 110, the end portion of the first impregnated portion 132 may be disposed close to the cover surface 222*a* of the housing cover 220.

In this case, according to the present embodiment, since the third impregnating agent L3 has a predetermined viscosity and fluidity, the third impregnating agent L3 may permeate and fill between a lower surface 312*a* of the first impregnated portion 132 and the cover surface 222*a* of the cover part 222. Accordingly, an air gap between the lower surface 312*b* of the first impregnated portion 132 and the cover surface 222*a* of the cover part 222 can be minimized, and the heat-dissipating performance of the motor can be improved.

In addition, the third impregnating agent L3 may permeate and fill between the outer circumferential surface 132*a* of the first impregnated portion 132 and the inner circumferential surface 212*a* of the body portion 212 of the housing body 210. Accordingly, an air gap between the outer circumferential surface 312*a* of the first impregnated portion 132 and the inner circumferential surface 212*a* of the body portion 212 of the housing body 210 can be minimized, and the heat-dissipating performance of the motor can be improved.

In addition, according to the present embodiment, although not illustrated in the drawings, the third impregnating agent L3 may be introduced between the outer circumferential surface 228*a* of the second pedestal 228 and the inner circumferential surface 133*a* of the first connecting hole 133. That is, an extra space which may accommodate an excessive amount of the third impregnating agent L3 may be provided between the outer circumferential surface 228*a* of the second pedestal 228 and the inner circumferential surface 133*a* of the first connecting hole 133. Accordingly, even when a slight large amount of the third impregnating agent L3 is injected onto the cover surface 222*a* of the cover part 222, a coupling tolerance between the housing body 210 and the housing cover 220 can be minimized, and the heat-dissipating performance can be improved.

Referring to FIGS. 1D and 17 again, in operation S700 of closing the accommodation space 213 using the housing cover 220 according to one embodiment of the present disclosure, the housing cover 220 is disposed close to the housing body 210 (S730), and the third impregnating agent L3 is cured to form a first heat sink portion (S740). In this case, the first heat sink portion is a solid portion formed by curing the third impregnating agent L3 between the outer surface of the first impregnated portion 132 and the inner surface of the housing body 210.

As described above, according to the present embodiment, an air gap between the outer surface of the first end-turn portion 124 and an inner surface of the housing cover 220 and the housing body 210 can be minimized, and in addition, since the first impregnated portion 132 and the first heat sink portion which have higher heat transfer rates than air can be formed, the heat-dissipating performance of the motor can be significantly improved.

In addition, in operation S700 of closing the accommodation space 213 using the housing cover 220 according to one embodiment of the present disclosure, the fixing jig 60 is separated from the housing cover 220 and the rotary shaft 320.

Referring to FIG. 18, through the above-described process, the motor 10 may be manufactured according to the method of manufacturing a motor according to one practical embodiment of the present disclosure. In the motor 10 manufactured according to the method of manufacturing a motor according to one embodiment of the present disclosure, since an air gap between the stator core, an outer surface of the coil, and the inner surface of the motor housing 200 can be minimized, and the impregnated portion and the heat sink portion which have high heat transfer rates can be provided, heat generated by the core and the coil can be smoothly transferred to the housing body 210 and the housing cover 220. That is, the heat-dissipating performance of the motor 10 can be improved.

In this case, since the motor 10 manufactured according to the method of manufacturing a motor according to one embodiment of the present disclosure includes the heat sink fin 230, heat transferred to the housing body 210 and housing cover 220 can be effectively dissipated. In particular, heat heat-dissipating through the heat sink fin 230 can be more effectively achieved because an extension direction of the heat sink fin 230 is parallel to a flow direction of wind W flowing around the motor 10.

In addition, the lower end portion of the rotary shaft 320 protruding downward from the motor housing 200 may be operatively connected to another device or apparatus for receiving power generated by the motor 10.

Hereinafter, a motor according to one embodiment of the present disclosure which can be manufactured through the method of manufacturing a motor according to one embodiment of the present disclosure will be briefly described. Referring to FIGS. 2A to 18, a motor 10 according to one embodiment of the present disclosure may include a stator core 110, a coil 120, a motor housing 200, a rotor core 310, a rotary shaft 320, and a heat transfer portion. In addition, the motor housing 200 may include a housing body 210, a housing cover 220, and a heat sink fin 230.

In this case, in the present embodiment, since the stator core 110, the coil 120, the motor housing 200, the rotor core 310, and the rotary shaft 320 may be the same as the stator core, the coil, the motor housing, the rotor core, and the rotary shaft described in the method of manufacturing a motor according to one embodiment of the present disclosure, detailed descriptions thereof will be omitted.

The heat transfer portion of the motor 10 according to one embodiment of the present disclosure may be interposed between an inner wall of the motor housing 200 and end-turn portions 124 and 126 to surround the end-turn portions 124 and 126 so that heat generated by the coil 120 may be transferred to the motor housing 200.

In this case, the end-turn portions 124 and 126 surrounded by the heat transfer portion may mean that outer side surfaces of the end-turn portions 124 and 126 protruding outward from the stator core 110 are surrounded by the heat transfer portion without portions exposed to air.

In this case, the heat transfer portion may be provided to transfer heat generated by the coil 120 to the motor housing 200. To this end, an outer side surface of the heat transfer portion facing the inner wall of the motor housing 200 is in contact with the inner wall of the motor housing 200. Accordingly, heat generated by the end-turn portions 124 and 126 may be transferred to the motor housing 200 through the heat transfer portion due to a mechanism of thermal conduction.

The heat transfer portion of the motor 10 according to the present embodiment may include a first heat transfer portion surrounding a first end-turn portion 124 and a second heat transfer portion surrounding a second end-turn portion 126.

In this case, the first heat transfer portion of the motor 10 according to one embodiment of the present disclosure may include a first impregnated portion 132 illustrated in FIG. 2A and a first heat sink portion formed by curing a third impregnating agent L3 illustrated in FIG. 17.

One part of the first heat transfer portion may be formed using predetermined jigs 20 to 40 and a first impregnating agent L1 as described in the method of manufacturing a motor according to one embodiment of the present disclosure. In the present embodiment, the one part of the first heat transfer portion may be the first impregnating agent L1.

Alternatively, another part of the first heat transfer portion may be formed using predetermined different jigs 50 and 60 and a third impregnating agent L3 as described in the method of manufacturing a motor according to one embodiment of the present disclosure. In the present embodiment, the other part of the first heat transfer portion may be the first heat sink portion.

As described above, one part of the first heat transfer portion of the motor 10 according to the present embodiment is primarily formed to surround the first end-turn portion 124 using the jig, and then another part may be secondarily formed between the one part and the inner wall of the motor housing 200.

Accordingly, the first heat transfer portion of the motor 10 according to the present embodiment may surround the first end-turn portion 124, and most of an outer side surface of the first heat transfer portion may be in surface contact with the inner wall of the motor housing 200. Accordingly, heat generated by the coil 120 may be effectively transferred to the motor housing 200 through the first heat transfer portion, and the heat-dissipating performance of the motor 10 can be maximized.

In addition, according to one embodiment of the present disclosure, the second heat transfer portion may include a second impregnated portion 134 illustrated in FIG. 2A, and a second heat sink portion formed by curing a heat sink liquid A and a second impregnating agent L2 illustrated in FIG. 14.

One part of the second heat transfer portion may be formed using the predetermined jigs 20 to 40 and the first impregnating agent L1 as described in the method of manufacturing a motor according to one embodiment of the present disclosure. In the present embodiment, the one part of the second heat transfer portion may be the second impregnated portion 134.

Alternatively, another part of the first heat transfer portion may be formed by arranging the stator core 110, the coil 120 wound around the stator core 110, and the one part of the second heat transfer portion in the motor housing 200 and then injecting the second impregnating agent L2 or coating with the heat sink liquid A as described in the above-described method of manufacturing a motor according to one embodiment of the present disclosure. In the present embodiment, the other part of the second heat transfer portion may be the second heat sink portion.

As described above, one part of the second heat transfer portion of the motor 10 according to the present embodiment is primarily formed to surround the second end-turn portion 126 using the jig, and then another part may be secondarily formed between the one part and the inner wall of the motor housing 200.

Accordingly, the second heat transfer portion of the motor 10 according to the present embodiment surrounds the second end-turn portion 126, and most of an outer side surface of the second heat transfer may also be in surface contact with the inner wall of the motor housing 200. Accordingly, heat generated by the coil 120 can be effectively transferred to the motor housing 200 through the second heat transfer portion, and the heat-dissipating performance of the motor 10 can maximized.

Meanwhile, the above-described motor according to one embodiment of the present disclosure may be manufactured through the method of manufacturing a motor according to one embodiment of the present disclosure but is not limited thereto.

According to a method of manufacturing a motor according to one aspect of the present disclosure, since an impregnated portion corresponding to a shape of an inner surface of a motor housing can be formed outside an end-turn portion, a motor in which an air gap between outer surfaces of a stator core and a coil and the inner surface of the motor housing is minimized and of which the heat-dissipating performance is improved can be manufactured.

According to a method of manufacturing a motor according to one aspect of the present disclosure, since an impregnating agent can be injected onto a bottom surface of a housing body to form a heat sink portion between an impregnated portion and an inner wall of the housing body, a motor in which an air gap between the impregnated portion and the inner wall of the housing body is minimized and of which the heat-dissipating performance is improved can be manufactured.

According to a method of manufacturing a motor according to one aspect of the present disclosure, since an outer surface of a heat sink portion can be coated with a heat sink liquid, a motor in which an air gap between an impregnated portion and an inner wall of a housing body is minimized and of which the heat-dissipating performance is improved can be manufactured.

According to a method of manufacturing a motor according to one aspect of the present disclosure, since an impregnating agent can be injected onto one surface of a housing cover to form a heat sink portion between an impregnated portion and the housing cover, an air gap between the impregnated portion and the housing cover is minimized and of which the heat-dissipating performance is improved can be manufactured.

According to a method of manufacturing a motor according to one aspect of the present disclosure, since a separate working fluid and a separate circulation system are not required for cooling a motor, a motor which is light and of which manufacturing and maintenance costs are low can be manufactured.

According to a motor according to one aspect of the present disclosure, since a heat transfer portion surrounding an end-turn portion of a coil is interposed between the end-turn portion and an inner wall of a motor housing to transfer heat generated by a core to the motor housing, the heat-dissipating performance can be maximized.

According to a motor according to one aspect of the present disclosure, since a surface, which faces an inner wall of a housing, among outer side surfaces of a heat transfer portion is formed in surface contact with the inner wall of the housing, heat generated by a coil can be dissipated through the heat transfer portion due to thermal conduction, the heat-dissipating performance can be more maximized.

Effects of the present invention are not limited to the above-described effects and should be understood to include all effects that may be inferred from the detailed description of the invention or structure of the invention described in the claims.

While some embodiments of the present invention have been described above, the spirit of the present invention is not limited to the embodiments proposed in this specification, and other embodiments may be easily suggested by adding, changing, and removing components within the scope of the same spirit by those skilled in the art and will fall within the spiritual range of the present invention.

What is claimed is:

1. A motor comprising:

a motor housing including a housing body having an accommodation space therein with one open side, and a housing cover coupled to the housing body to close the accommodation space;

a stator core disposed in the accommodation space of the motor housing and including a center hole extending in one direction;

a coil disposed on a circumference of the center hole of the stator core and wound around the stator core, the coil including a first end-turn portion protruding from one side of the stator core and a second end-turn portion protruding from the other side of the stator core;

a heat transfer portion interspersed between an inner wall of the motor housing and the end-turn portions of the coil to surround the end-turn portions of the coil, the heat transfer portion configured to transfer heat generated by the coil to the motor housing;

a rotor core rotatably disposed in the center hole of the stator core; and a rotary shaft coupled to the rotor core, wherein the heat transfer portion comprises:

a first impregnated body formed by curing a first impregnating liquid on an outer side of the first end-turn portion;

a second impregnated body formed by curing a first impregnating liquid on an outer side of the second end-turn portion;

a first heat sink body formed by curing a third impregnating liquid between an outer circumferential surface of the first impregnated body and an inner circumferential surface of the housing body, and between an end portion of the first impregnated body and a cover surface of the housing cover; and a second heat sink body comprising a first part formed by curing a heat sink liquid between an outer circumferential surface of the second impregnated body and an inner circumferential surface of the housing body, and a second part formed by curing a second impregnating liquid between a lower surface of the second impregnated body and a bottom surface of the housing body.

2. The motor of claim 1, wherein a surface of the heat transfer portion facing the inner wall of the motor housing at least partially contacts the inner wall of the motor housing.

3. The motor of claim 1, wherein:

one part of the heat transfer portion is formed by curing an impregnating agent injected into a jig after the stator core and the coil wound around the stator core are disposed in the jig; and another part of the heat transfer portion is formed by curing an impregnating agent injected into the motor housing after the stator core, the coil wound around the stator core, and the one part of the heat transfer portion are disposed in the motor housing.

4. The motor of claim 1, wherein the motor housing includes:

a heat sink fin protruding from an outer surface of the housing body to emit heat to an outside of the motor housing.

* * * * *